US012448877B2

(12) United States Patent
Oehring et al.

(10) Patent No.: US 12,448,877 B2
(45) Date of Patent: Oct. 21, 2025

(54) HIGH HORSEPOWER PUMPING CONFIGURATION FOR AN ELECTRIC HYDRAULIC FRACTURING SYSTEM

(71) Applicant: U.S. Well Services, LLC, Houston, TX (US)

(72) Inventors: Jared Oehring, Houston, TX (US); Brandon N. Hinderliter, Houston, TX (US); Lon Robinson, Houston, TX (US)

(73) Assignee: U.S. WELL SERVICES, LLC, Willow Park, TX (US)

( * ) Notice: Subject to any disclaimer, the term of this patent is extended or adjusted under 35 U.S.C. 154(b) by 0 days.

(21) Appl. No.: 17/903,831

(22) Filed: Sep. 6, 2022

(65) Prior Publication Data

US 2023/0103589 A1 Apr. 6, 2023

Related U.S. Application Data

(63) Continuation of application No. 16/871,928, filed on May 11, 2020, now Pat. No. 11,434,737, which is a (Continued)

(51) Int. Cl.
*E21B 43/26* (2006.01)
*F04B 17/03* (2006.01)
(Continued)

(52) U.S. Cl.
CPC .......... *E21B 43/2607* (2020.05); *F04D 13/06* (2013.01); *H02J 3/38* (2013.01); *H02P 5/74* (2013.01); *F04D 7/00* (2013.01)

(58) Field of Classification Search
CPC ...... E21B 43/2607; F04B 23/04; F04B 17/03; F04B 17/06; F04D 13/06
See application file for complete search history.

(56) References Cited

U.S. PATENT DOCUMENTS 1,541,601 A 6/1925 Tribe
1,656,861 A 1/1928 Leonard
(Continued)

FOREIGN PATENT DOCUMENTS

AU 2007340913 7/2008
CA 2406801 11/2001
(Continued)

OTHER PUBLICATIONS

Office Action mailed May 10, 2019 in corresponding U.S. Appl. No. 16/268,030.
(Continued)

*Primary Examiner* — Kenneth L Thompson
(74) *Attorney, Agent, or Firm* — Abel Schillinger, LLP

(57) ABSTRACT

Embodiments include a hydraulic fracturing system for fracturing a subterranean formation. The system includes an electric pump, arranged on a first support structure, the electric pump coupled to a well associated with the subterranean formation and powered by at least one electric motor, and configured to pump fluid into a wellbore associated with the well at a high pressure so that the fluid passes from the wellbore into the subterranean formation and fractures the subterranean formation. The system also includes support equipment, arranged on a second support structure, electrically coupled to the electric pump, wherein the support equipment includes at least a transformer for distributing power to the electric pump, the power being received from at least one generator at a voltage higher than an operating voltage of the electric pump.

19 Claims, 11 Drawing Sheets

Related U.S. Application Data continuation of application No. 16/210,749, filed on Dec. 5, 2018, now Pat. No. 10,648,311.

(60) Provisional application No. 62/595,411, filed on Dec. 6, 2017, provisional application No. 62/594,925, filed on Dec. 5, 2017.

(51) Int. Cl.

| | |
|---|---|
| ***F04B 17/06*** | (2006.01) |
| ***F04D 13/06*** | (2006.01) |
| ***H02J 3/38*** | (2006.01) |
| ***H02P 5/74*** | (2006.01) |
| *F04D 7/00* | (2006.01) |

(56) References Cited

U.S. PATENT DOCUMENTS 1,671,436 A 5/1928 Melott
1,743,771 A 1/1930 Hall
1,967,466 A 7/1934 Damsel
2,004,077 A 6/1935 McCartney
2,183,364 A 12/1939 Bailey
2,220,622 A 11/1940 Aitken
2,244,106 A 6/1941 Granberg
2,248,051 A 7/1941 Armstrong
2,407,796 A 9/1946 Page
2,416,848 A 3/1947 Rothery
2,753,940 A 7/1956 Bonner
2,976,025 A 3/1961 Pro
3,061,039 A 10/1962 Peters
3,066,503 A 12/1962 Fleming
3,302,069 A 1/1967 Webster
3,334,495 A 8/1967 Jensen
3,347,570 A 10/1967 Roessler
3,722,595 A 3/1973 Kiel
3,764,233 A 10/1973 Strickland
3,773,140 A 11/1973 Mahajan
3,837,179 A 9/1974 Barth
3,849,662 A 11/1974 Blaskowski
3,878,884 A 4/1975 Raleigh
3,881,551 A 5/1975 Terry
3,967,841 A 7/1976 Kendrick
4,037,431 A 7/1977 Sugimoto
4,100,822 A 7/1978 Rosman
4,151,575 A 4/1979 Hogue
4,226,299 A 10/1980 Hansen
4,265,266 A 5/1981 Kierbow et al.
4,411,313 A 10/1983 Johnson et al.
4,432,064 A 2/1984 Barker
4,442,665 A 4/1984 Fick et al.
4,456,092 A 6/1984 Kubozuka
4,506,982 A 3/1985 Smithers et al.
4,512,387 A 4/1985 Rodriguez
4,529,887 A 7/1985 Johnson
4,538,916 A 9/1985 Zimmerman
4,601,629 A 7/1986 Zimmerman
4,676,063 A 6/1987 Goebel et al.
4,759,674 A 7/1988 Schroder
4,768,884 A 9/1988 Elkin
4,783,038 A 11/1988 Gilbert
4,793,386 A 12/1988 Sloan
4,845,981 A 7/1989 Pearson
4,922,463 A 5/1990 Del Zotto et al.
5,006,044 A 4/1991 Walker, Sr.
5,025,861 A 6/1991 Huber et al.
5,050,673 A 9/1991 Baldridge
5,114,239 A 5/1992 Allen
5,130,628 A 7/1992 Owen
5,131,472 A 7/1992 Dees et al.
5,172,009 A 12/1992 Mohan
5,189,388 A 2/1993 Mosley
5,293,947 A 3/1994 Stratton
5,334,899 A 8/1994 Skybyk
5,366,324 A 11/1994 Arlt et al.
5,422,550 A 6/1995 McClanahan
5,439,066 A 8/1995 Gipson
5,486,047 A 1/1996 Zimmerman
5,517,822 A 5/1996 Haws et al.
5,548,093 A 8/1996 Sato
5,549,285 A 8/1996 Collins
5,590,976 A 1/1997 Kilheffer et al.
5,606,853 A 3/1997 Birch
5,655,361 A 8/1997 Kishi
5,736,838 A 4/1998 Dove et al.
5,755,096 A 5/1998 Holleyman
5,790,972 A 8/1998 Kohlenberger
5,791,636 A 8/1998 Loziuk
5,798,596 A 8/1998 Lordo
5,813,455 A 9/1998 Pratt et al.
5,865,247 A 2/1999 Paterson
5,879,137 A 3/1999 Yie
5,894,888 A 4/1999 Wiemers
5,907,970 A 6/1999 Havlovick et al.
5,950,726 A 9/1999 Roberts
6,035,265 A 3/2000 Dister et al.
6,097,310 A 8/2000 Harrell et al.
6,116,040 A 9/2000 Stark
6,121,705 A 9/2000 Hoong
6,138,764 A 10/2000 Scarsdale et al.
6,142,878 A 11/2000 Barin
6,164,910 A 12/2000 Mayleben
6,202,702 B1 3/2001 Ohira
6,208,098 B1 3/2001 Kume
6,254,462 B1 7/2001 Kelton
6,271,637 B1 8/2001 Kushion
6,273,193 B1 8/2001 Hermann
6,315,523 B1 11/2001 Mills
6,406,011 B1 6/2002 Kosar
6,442,942 B1 9/2002 Kopko
6,477,852 B2 11/2002 Dodo
6,484,490 B1 11/2002 Olsen
6,491,098 B1 12/2002 Dallas
6,510,695 B1 1/2003 Fisher
6,529,135 B1 3/2003 Bowers et al.
6,585,455 B1 7/2003 Petersen et al.
6,626,646 B2 9/2003 Rajewski
6,765,304 B2 * 7/2004 Baten ...................... F02B 63/04
290/1 A
6,776,227 B2 8/2004 Beida
6,788,022 B2 9/2004 Sopko
6,802,690 B2 10/2004 Hansen
6,808,303 B2 10/2004 Fisher
6,837,910 B1 1/2005 Yoshikawa
6,931,310 B2 8/2005 Shimizu et al.
6,936,947 B1 8/2005 Leijon
6,985,750 B1 1/2006 Vicknair et al.
7,082,993 B2 8/2006 Ayoub
7,104,233 B2 9/2006 Ryczek et al.
7,170,262 B2 1/2007 Pettigrew
7,173,399 B2 2/2007 Sihler
7,279,655 B2 10/2007 Blutke
7,308,933 B1 12/2007 Mayfield
7,309,835 B2 12/2007 Morrison
7,312,593 B1 12/2007 Streicher et al.
7,336,514 B2 2/2008 Amarillas
7,341,287 B2 3/2008 Gibb
7,445,041 B2 11/2008 O'Brien
7,494,263 B2 2/2009 Dykstra et al.
7,500,642 B2 3/2009 Cunningham
7,525,264 B2 4/2009 Dodge
7,563,076 B2 7/2009 Brunet
7,581,379 B2 9/2009 Yoshida
7,675,189 B2 3/2010 Grenier
7,683,499 B2 3/2010 Saucier
7,717,193 B2 5/2010 Egilsson et al.
7,755,310 B2 7/2010 West et al.
7,770,396 B2 8/2010 Roby
7,795,830 B2 9/2010 Johnson
7,807,048 B2 10/2010 Collette
7,835,140 B2 11/2010 Mori
7,845,413 B2 12/2010 Shampine et al.
7,894,757 B2 2/2011 Matsuno
7,900,893 B2 3/2011 Teurlay

(56) References Cited

U.S. PATENT DOCUMENTS 7,926,562 B2 4/2011 Poitzsch
7,940,039 B2 5/2011 De Buda
7,977,824 B2 7/2011 Halen et al.
8,037,936 B2 10/2011 Neuroth
8,054,084 B2 11/2011 Schulz et al.
8,083,504 B2 12/2011 Williams
8,096,354 B2 1/2012 Poitzsch
8,096,891 B2 1/2012 Lochtefeld
8,139,383 B2 3/2012 Efraimsson
8,146,665 B2 4/2012 Neal
8,154,419 B2 4/2012 Daussin et al.
8,221,513 B2 7/2012 Ariyapadi
8,232,892 B2 7/2012 Overholt et al.
8,261,528 B2 9/2012 Chillar
8,272,439 B2 9/2012 Strickland
8,310,272 B2 11/2012 Quarto
8,354,817 B2 1/2013 Yeh et al.
8,474,521 B2 7/2013 Kajaria
RE44,444 E 8/2013 Dole
8,506,267 B2 8/2013 Gambier et al.
8,534,235 B2 9/2013 Chandler
8,556,302 B2 10/2013 Dole
8,573,303 B2 11/2013 Kerfoot
8,596,056 B2 12/2013 Woodmansee
8,616,005 B1 12/2013 Cousino
8,616,274 B2 12/2013 Belcher et al.
8,646,521 B2 2/2014 Bowen
8,692,408 B2 4/2014 Zhang et al.
8,727,068 B2 5/2014 Bruin
8,760,657 B2 6/2014 Pope
8,763,387 B2 7/2014 Schmidt
8,774,972 B2 7/2014 Rusnak et al.
8,789,601 B2 7/2014 Broussard
8,795,525 B2 8/2014 McGinnis et al.
8,807,960 B2 8/2014 Stephenson
8,838,341 B2 9/2014 Kumano
8,851,860 B1 10/2014 Mail
8,857,506 B2 10/2014 Stone, Jr.
8,899,940 B2 12/2014 Leugemors
8,905,056 B2 12/2014 Kendrick
8,905,138 B2 12/2014 Lundstedt et al.
8,997,904 B2 * 4/2015 Cryer ...................... B60K 1/00
180/53.5
9,018,881 B2 4/2015 Mao et al.
9,051,822 B2 6/2015 Ayan
9,051,923 B2 6/2015 Kuo
9,062,545 B2 6/2015 Roberts et al.
9,067,182 B2 6/2015 Nichols
9,103,193 B2 8/2015 Coli
9,119,326 B2 8/2015 McDonnell
9,121,257 B2 9/2015 Coli et al.
9,140,105 B2 9/2015 Pattillo
9,140,110 B2 9/2015 Coli et al.
9,160,168 B2 10/2015 Chapel
9,175,554 B1 11/2015 Watson
9,206,684 B2 12/2015 Parra
9,322,239 B2 4/2016 Angeles Boza et al.
9,353,593 B1 5/2016 Lu et al.
9,366,114 B2 * 6/2016 Coli .................... H02K 7/1823
9,410,410 B2 8/2016 Broussard et al.
9,450,385 B2 9/2016 Kristensen
9,458,687 B2 10/2016 HallundbaeK
9,475,020 B2 10/2016 Coli et al.
9,475,021 B2 10/2016 Coli et al.
9,482,086 B2 11/2016 Richardson et al.
9,506,333 B2 11/2016 Castillo et al.
9,534,473 B2 1/2017 Morris et al.
9,562,420 B2 2/2017 Morris et al.
9,587,649 B2 3/2017 Oehring
9,611,728 B2 4/2017 Oehring
9,650,871 B2 5/2017 Oehring et al.
9,650,879 B2 5/2017 Broussard et al.
9,706,185 B2 7/2017 Ellis
9,728,354 B2 8/2017 Skolozdra
9,738,461 B2 8/2017 DeGaray
9,739,546 B2 8/2017 Bertilsson et al.
9,745,840 B2 8/2017 Oehring et al.
9,790,858 B2 10/2017 Kanebako
9,840,901 B2 12/2017 Oehring et al.
9,863,228 B2 1/2018 Shampine et al.
9,893,500 B2 2/2018 Oehring
9,903,190 B2 2/2018 Conrad
9,915,128 B2 3/2018 Hunter
9,932,799 B2 4/2018 Symchuk
9,945,365 B2 4/2018 Hernandez et al.
9,963,961 B2 5/2018 Hardin
9,970,278 B2 5/2018 Broussard
9,976,351 B2 5/2018 Randall
9,995,218 B2 6/2018 Oehring
10,008,880 B2 6/2018 Vicknair
10,020,711 B2 7/2018 Oehring
10,036,238 B2 7/2018 Oehring
10,107,086 B2 10/2018 Oehring
10,119,381 B2 11/2018 Oehring
10,122,167 B2 * 11/2018 Boe ........................ H02K 5/132
10,184,465 B2 1/2019 Enis et al.
10,196,878 B2 2/2019 Hunter
10,221,639 B2 3/2019 Romer et al.
10,227,854 B2 3/2019 Glass
10,232,332 B2 3/2019 Oehring
10,246,984 B2 4/2019 Payne
10,254,732 B2 4/2019 Oehring
10,260,327 B2 4/2019 Kajaria
10,280,724 B2 5/2019 Hinderliter
10,287,873 B2 5/2019 Filas
10,302,079 B2 5/2019 Kendrick
10,309,205 B2 6/2019 Randall
10,337,308 B2 7/2019 Broussard
10,371,012 B2 8/2019 Davis
10,378,326 B2 8/2019 Morris
10,393,108 B2 8/2019 Chong
10,407,990 B2 9/2019 Oehring
10,408,030 B2 9/2019 Oehring
10,408,031 B2 9/2019 Oehring
10,415,332 B2 9/2019 Morris et al.
10,436,026 B2 10/2019 Ounadjela
10,526,882 B2 1/2020 Oehring
10,627,003 B2 4/2020 Dale et al.
10,648,270 B2 5/2020 Brunty et al.
10,648,311 B2 * 5/2020 Oehring .................... H02P 5/74
10,669,471 B2 6/2020 Schmidt et al.
10,686,301 B2 6/2020 Oehring et al.
10,690,131 B2 6/2020 Rashid
10,695,950 B2 6/2020 Igo et al.
10,711,576 B2 7/2020 Bishop
10,731,561 B2 8/2020 Oehring et al.
10,740,730 B2 8/2020 Altamirano et al.
10,767,561 B2 9/2020 Brady
10,781,752 B2 9/2020 Kikkawa et al.
10,794,165 B2 10/2020 Fischer et al.
10,865,624 B1 * 12/2020 Cui ..................... E21B 41/0085
10,934,824 B2 3/2021 Oehring
10,988,998 B2 4/2021 Fischer et al.
11,091,992 B2 8/2021 Broussard
11,434,737 B2 * 9/2022 Oehring .................... H02P 5/74
2001/0000996 A1 5/2001 Grimland et al.
2002/0169523 A1 11/2002 Ross et al.
2003/0056514 A1 3/2003 Lohn
2003/0057704 A1 3/2003 Baten
2003/0079875 A1 5/2003 Weng
2003/0138327 A1 7/2003 Jones et al.
2004/0040746 A1 3/2004 Niedermayr
2004/0045703 A1 3/2004 Hooper et al.
2004/0102109 A1 5/2004 Cratty et al.
2004/0167738 A1 8/2004 Miller
2005/0061548 A1 3/2005 Hooper
2005/0116541 A1 6/2005 Seiver
2005/0201197 A1 9/2005 Duell et al.
2005/0274508 A1 12/2005 Folk
2006/0052903 A1 3/2006 Bassett
2006/0109141 A1 5/2006 Huang
2006/0260331 A1 11/2006 Andreychuk
2007/0125544 A1 6/2007 Robinson
2007/0131410 A1 6/2007 Hill

(56) References Cited

U.S. PATENT DOCUMENTS

2007/0187163 A1 8/2007 Cone
2007/0201305 A1 8/2007 Heilman et al.
2007/0226089 A1 9/2007 DeGaray et al.
2007/0277982 A1 12/2007 Shampine
2007/0278140 A1 12/2007 Mallett et al.
2008/0017369 A1 1/2008 Sarada
2008/0041596 A1 2/2008 Blount
2008/0095644 A1 4/2008 Mantei et al.
2008/0112802 A1 5/2008 Orlando
2008/0137266 A1 6/2008 Jensen
2008/0164023 A1 7/2008 Dykstra et al.
2008/0208478 A1 8/2008 Ella et al.
2008/0217024 A1 9/2008 Moore
2008/0236818 A1 10/2008 Dykstra
2008/0257449 A1 10/2008 Weinstein et al.
2008/0264625 A1 10/2008 Ochoa
2008/0264640 A1 10/2008 Eslinger
2008/0264649 A1 10/2008 Crawford
2008/0277120 A1 11/2008 Hickie
2008/0288115 A1 11/2008 Rusnak
2009/0045782 A1 2/2009 Datta
2009/0065299 A1 3/2009 Vito
2009/0068031 A1 3/2009 Gambier
2009/0072645 A1 3/2009 Quere
2009/0078410 A1 3/2009 Krenek et al.
2009/0090504 A1 4/2009 Weightman
2009/0093317 A1 4/2009 Kajiwara et al.
2009/0095482 A1 4/2009 Surjaatmadja
2009/0114392 A1 5/2009 Tolman
2009/0145611 A1 6/2009 Pallini, Jr.
2009/0153354 A1 6/2009 Daussin et al.
2009/0188181 A1 7/2009 Forbis
2009/0200035 A1 8/2009 Bjerkreim et al.
2009/0260826 A1 10/2009 Sherwood
2009/0308602 A1 12/2009 Bruins et al.
2009/0315297 A1 12/2009 Nadeau
2010/0000508 A1 1/2010 Chandler
2010/0019574 A1 1/2010 Baldassarre et al.
2010/0038907 A1 2/2010 Hunt
2010/0045109 A1 2/2010 Arnold
2010/0051272 A1 3/2010 Loree et al.
2010/0101785 A1 4/2010 Khvoshchev
2010/0132949 A1 6/2010 DeFosse et al.
2010/0146981 A1 6/2010 Motakef
2010/0172202 A1 7/2010 Borgstadt
2010/0193057 A1 8/2010 Garner
2010/0200224 A1 8/2010 Nguete
2010/0250139 A1 9/2010 Hobbs et al.
2010/0281876 A1 11/2010 Khan
2010/0293973 A1 11/2010 Erickson
2010/0303655 A1 12/2010 Scekic
2010/0322802 A1 12/2010 Kugelev
2011/0005757 A1 1/2011 Hebert
2011/0017468 A1 1/2011 Birch et al.
2011/0052423 A1 3/2011 Gambier et al.
2011/0061855 A1 3/2011 Case et al.
2011/0081268 A1 4/2011 Ochoa et al.
2011/0085924 A1 4/2011 Shampine
2011/0110793 A1 5/2011 Leugemors et al.
2011/0166046 A1 7/2011 Weaver
2011/0175397 A1 7/2011 Amrine
2011/0197988 A1 8/2011 Van Vliet
2011/0241590 A1 10/2011 Horikoshi
2011/0247878 A1 10/2011 Rasheed
2011/0272158 A1 11/2011 Neal
2012/0018016 A1 1/2012 Gibson
2012/0049625 A1 3/2012 Hopwood
2012/0063936 A1 3/2012 Baxter et al.
2012/0085541 A1 4/2012 Love et al.
2012/0112757 A1 5/2012 Vrankovic
2012/0127635 A1 5/2012 Grindeland
2012/0150455 A1 6/2012 Franklin et al.
2012/0152716 A1 6/2012 Kikukawa et al.
2012/0205301 A1 8/2012 McGuire et al.
2012/0205400 A1 8/2012 DeGaray et al.
2012/0222865 A1 9/2012 Larson
2012/0232728 A1 9/2012 Karimi et al.
2012/0247783 A1 10/2012 Berner, Jr.
2012/0255734 A1 10/2012 Coli et al.
2013/0009469 A1 1/2013 Gillett
2013/0025706 A1 1/2013 DeGaray et al.
2013/0051971 A1 2/2013 Wyse et al.
2013/0078114 A1 3/2013 Van Rijswick
2013/0138254 A1 5/2013 Seals
2013/0175038 A1 7/2013 Conrad
2013/0175039 A1 7/2013 Guidry
2013/0180722 A1 7/2013 Olarte Caro et al.
2013/0189629 A1 7/2013 Chandler
2013/0199617 A1 8/2013 DeGaray et al.
2013/0233542 A1 9/2013 Shampine
2013/0255271 A1 10/2013 Yu et al.
2013/0284455 A1 10/2013 Kajaria et al.
2013/0299167 A1 11/2013 Fordyce et al.
2013/0306322 A1 11/2013 Sanborn et al.
2013/0341029 A1 12/2013 Roberts et al.
2013/0343858 A1 12/2013 Flusche
2014/0000899 A1 1/2014 Nevison
2014/0010671 A1 1/2014 Cryer et al.
2014/0054965 A1 2/2014 Jain
2014/0060658 A1 3/2014 Hains
2014/0077607 A1 3/2014 Clarke
2014/0095114 A1 4/2014 Thomeer
2014/0096974 A1 4/2014 Coli
2014/0124162 A1 5/2014 Leavitt
2014/0138079 A1 5/2014 Broussard et al.
2014/0174717 A1 6/2014 Broussard et al.
2014/0219824 A1 8/2014 Burnette
2014/0246211 A1 9/2014 Guidry et al.
2014/0251623 A1 9/2014 Lestz et al.
2014/0255214 A1 9/2014 Burnette
2014/0277772 A1 9/2014 Lopez
2014/0290768 A1 10/2014 Randle
2014/0294603 A1 10/2014 Best
2014/0379300 A1 12/2014 Devine
2015/0027712 A1 1/2015 Vicknair
2015/0053426 A1 2/2015 Smith
2015/0068724 A1 3/2015 Coli et al.
2015/0068754 A1 3/2015 Coli et al.
2015/0075778 A1 3/2015 Walters
2015/0083426 A1 3/2015 Lesko
2015/0097504 A1 4/2015 Lamascus
2015/0114652 A1 4/2015 Lestz
2015/0136043 A1 5/2015 Shaaban
2015/0144336 A1 5/2015 Hardin et al.
2015/0147194 A1 5/2015 Foote
2015/0159911 A1 6/2015 Holt
2015/0175013 A1 6/2015 Cryer et al.
2015/0176386 A1 6/2015 Castillo et al.
2015/0211512 A1 7/2015 Wiegman
2015/0211524 A1 7/2015 Broussard
2015/0217672 A1 8/2015 Shampine
2015/0225113 A1 8/2015 Lungu
2015/0233530 A1 8/2015 Sandidge
2015/0252661 A1 9/2015 Glass
2015/0300145 A1 10/2015 Coli et al.
2015/0314225 A1 11/2015 Coli et al.
2015/0330172 A1 11/2015 Allmaras
2015/0354322 A1 12/2015 Vicknair
2016/0006311 A1 1/2016 Li
2016/0032703 A1 2/2016 Broussard et al.
2016/0102537 A1 4/2016 Lopez
2016/0105022 A1 4/2016 Oehring
2016/0160889 A1 6/2016 Hoffman et al.
2016/0177675 A1 6/2016 Morris et al.
2016/0177678 A1 6/2016 Morris
2016/0186531 A1 6/2016 Harkless et al.
2016/0208592 A1 7/2016 Oehring
2016/0208593 A1 7/2016 Coli et al.
2016/0208594 A1 7/2016 Coli et al.
2016/0208595 A1 7/2016 Tang
2016/0221220 A1 8/2016 Paige
2016/0230524 A1 8/2016 Dumoit
2016/0230525 A1 8/2016 Lestz et al.
2016/0230660 A1 8/2016 Zeitoun et al.

(56) References Cited

U.S. PATENT DOCUMENTS

| | | | |
|---|---|---|---|
| 2016/0258267 A1 | 9/2016 | Payne et al. | |
| 2016/0265457 A1 | 9/2016 | Stephenson | |
| 2016/0273328 A1 | 9/2016 | Oehring | |
| 2016/0273456 A1 | 9/2016 | Zhang et al. | |
| 2016/0281484 A1 | 9/2016 | Lestz et al. | |
| 2016/0290114 A1 | 10/2016 | Oehring | |
| 2016/0290563 A1 | 10/2016 | Diggins | |
| 2016/0312108 A1 | 10/2016 | Lestz et al. | |
| 2016/0319650 A1 | 11/2016 | Oehring | |
| 2016/0326853 A1 | 11/2016 | Fred et al. | |
| 2016/0326854 A1 | 11/2016 | Broussard | |
| 2016/0326855 A1 | 11/2016 | Coli et al. | |
| 2016/0341281 A1 | 11/2016 | Brunvold et al. | |
| 2016/0348479 A1 | 12/2016 | Oehring | |
| 2016/0349728 A1 | 12/2016 | Oehring | |
| 2016/0369609 A1 | 12/2016 | Morris et al. | |
| 2017/0016433 A1 | 1/2017 | Chong | |
| 2017/0021318 A1 | 1/2017 | McIver et al. | |
| 2017/0022788 A1 | 1/2017 | Oehring et al. | |
| 2017/0022807 A1 | 1/2017 | Dursun | |
| 2017/0028368 A1 | 2/2017 | Oehring et al. | |
| 2017/0030177 A1 | 2/2017 | Oehring et al. | |
| 2017/0030178 A1 | 2/2017 | Oehring et al. | |
| 2017/0036178 A1 | 2/2017 | Coli et al. | |
| 2017/0036872 A1 | 2/2017 | Wallace et al. | |
| 2017/0037717 A1 | 2/2017 | Oehring | |
| 2017/0037718 A1 | 2/2017 | Coli et al. | |
| 2017/0043280 A1 | 2/2017 | Vankouwenberg | |
| 2017/0051732 A1 | 2/2017 | Hemandez et al. | |
| 2017/0074076 A1 | 3/2017 | Joseph et al. | |
| 2017/0082033 A1 | 3/2017 | Wu et al. | |
| 2017/0096885 A1 | 4/2017 | Oehring | |
| 2017/0096889 A1 | 4/2017 | Blanckaert et al. | |
| 2017/0104389 A1 | 4/2017 | Morris et al. | |
| 2017/0114625 A1 | 4/2017 | Norris | |
| 2017/0138171 A1 | 5/2017 | Richards et al. | |
| 2017/0145918 A1 | 5/2017 | Oehring | |
| 2017/0146189 A1 | 5/2017 | Herman | |
| 2017/0159570 A1 | 6/2017 | Bickert | |
| 2017/0159654 A1 | 6/2017 | Kendrick | |
| 2017/0204852 A1 | 7/2017 | Barnett | |
| 2017/0212535 A1 | 7/2017 | Shelman et al. | |
| 2017/0218727 A1 | 8/2017 | Oehring | |
| 2017/0218843 A1 | 8/2017 | Oehring | |
| 2017/0222409 A1 | 8/2017 | Oehring | |
| 2017/0226838 A1 | 8/2017 | Ciezobka et al. | |
| 2017/0226839 A1 | 8/2017 | Broussard | |
| 2017/0226842 A1 | 8/2017 | Omont | |
| 2017/0234250 A1 | 8/2017 | Janik | |
| 2017/0241221 A1 | 8/2017 | Seshadri | |
| 2017/0259227 A1 | 9/2017 | Morris et al. | |
| 2017/0292513 A1 | 10/2017 | Haddad | |
| 2017/0313499 A1 | 11/2017 | Hughes et al. | |
| 2017/0314380 A1 | 11/2017 | Oehring | |
| 2017/0314979 A1 | 11/2017 | Ye | |
| 2017/0328179 A1 | 11/2017 | Dykstra | |
| 2017/0369258 A1 | 12/2017 | DeGaray | |
| 2017/0370639 A1 | 12/2017 | Barden et al. | |
| 2018/0028992 A1 | 2/2018 | Stegemoeller | |
| 2018/0038216 A1 | 2/2018 | Zhang | |
| 2018/0090914 A1 | 3/2018 | Johnson et al. | |
| 2018/0156210 A1 | 6/2018 | Oehring | |
| 2018/0181830 A1 | 6/2018 | Luharuka et al. | |
| 2018/0183219 A1 | 6/2018 | Oehring | |
| 2018/0216455 A1 | 8/2018 | Andreychuk | |
| 2018/0245428 A1 | 8/2018 | Richards | |
| 2018/0258746 A1 | 9/2018 | Broussard | |
| 2018/0259080 A1 | 9/2018 | Dale et al. | |
| 2018/0266217 A1 | 9/2018 | Funkhouser et al. | |
| 2018/0274446 A1 | 9/2018 | Oehring | |
| 2018/0284817 A1 | 10/2018 | Cook et al. | |
| 2018/0298731 A1 | 10/2018 | Bishop | |
| 2018/0312738 A1 | 11/2018 | Rutsch et al. | |
| 2018/0313677 A1 | 11/2018 | Warren et al. | |
| 2018/0320483 A1 | 11/2018 | Zhang | |
| 2018/0363437 A1 | 12/2018 | Coli et al. | |
| 2018/0363640 A1 | 12/2018 | Kajita et al. | |
| 2018/0366950 A1 | 12/2018 | Pedersen et al. | |
| 2019/0003329 A1 | 1/2019 | Morris et al. | |
| 2019/0010793 A1 | 1/2019 | Hinderliter | |
| 2019/0040727 A1 | 2/2019 | Oehring et al. | |
| 2019/0063309 A1 | 2/2019 | Davis | |
| 2019/0100989 A1 | 4/2019 | Stewart | |
| 2019/0112910 A1 | 4/2019 | Oehring | |
| 2019/0120024 A1 | 4/2019 | Oehring | |
| 2019/0128080 A1 | 5/2019 | Ross | |
| 2019/0128104 A1 | 5/2019 | Graham et al. | |
| 2019/0145251 A1 | 5/2019 | Johnson | |
| 2019/0154020 A1 | 5/2019 | Glass | |
| 2019/0162061 A1 | 5/2019 | Stephenson | |
| 2019/0169971 A1 | 6/2019 | Oehring | |
| 2019/0178057 A1 | 6/2019 | Hunter | |
| 2019/0178235 A1 | 6/2019 | Coskrey | |
| 2019/0203567 A1 | 7/2019 | Ross | |
| 2019/0203572 A1 | 7/2019 | Morris | |
| 2019/0211661 A1 | 7/2019 | Reckels | |
| 2019/0226317 A1 | 7/2019 | Payne | |
| 2019/0245348 A1 | 8/2019 | Hinderliter | |
| 2019/0249527 A1 | 8/2019 | Kraynek | |
| 2019/0257462 A1 | 8/2019 | Rogers | |
| 2019/0292866 A1 | 9/2019 | Ross | |
| 2019/0292891 A1 | 9/2019 | Kajaria | |
| 2019/0316447 A1 | 10/2019 | Oehring | |
| 2019/0338762 A1* | 11/2019 | Curry | F04D 29/605 |
| 2020/0040878 A1 | 2/2020 | Morris | |
| 2020/0047141 A1 | 2/2020 | Oehring et al. | |
| 2020/0088152 A1 | 3/2020 | Alloin et al. | |
| 2020/0325760 A1 | 10/2020 | Markham | |
| 2020/0350790 A1 | 11/2020 | Luft et al. | |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| CN | 104117308 A1 | 10/2014 |
| CN | 104196613 A1 | 12/2014 |
| CN | 205986303 U | 2/2017 |
| CN | 108049999 A1 | 5/2018 |
| CN | 112196508 A1 | 1/2021 |
| JP | 2004264589 | 9/2004 |
| WO | 00/47893 | 8/2000 |
| WO | 2009046280 | 4/2009 |
| WO | 2012/051705 | 4/2012 |
| WO | 2014/116761 | 7/2014 |
| WO | 2014177346 | 11/2014 |
| WO | 2016/144939 | 9/2016 |
| WO | 2016/160458 | 10/2016 |
| WO | 2018044307 A1 | 3/2018 |
| WO | 2018213925 A1 | 11/2018 |
| WO | 2019210417 | 11/2019 |

(56) References Cited

OTHER PUBLICATIONS

Office Action mailed Oct. 11, 2019 in related U.S. Appl. No. 16/385,070.
Office Action mailed Oct. 2, 2019 in related U.S. Appl. No. 16/152,732.
Office Action mailed Sep. 11, 2019 in related U.S. Appl. No. 16/268,030.
Office Action mailed Sep. 20, 2019 in related U.S. Appl. No. 16/443,273.
Office Action mailed Sep. 3, 2019 in related U.S. Appl. No. 15/994,772.
OSHA Publications, U.S. Department of Labor—Occupational Safety and Health Administration, https://web.archive.t>rg/web/20150406054914/https://www.osha.gov/pls/publications/publication.AthruZ?pType=Industry, Jun. 13, 2021, 3 pages.
Portfolio Media Inc., A Shift to Sand: Spotlight on Silica Use in Fracking, Law360, https://www.law360.com/articles/366057/print?section=energy, accessed Jun. 10, 2021, 5 pages.
Professional Publications, Inc., Books for the FE, PE, FLS and PLS Exams, Spring 2004, http://www.ppi2pass.com/corner/catalog.pdf, 16 pages.
Professional Publications, Inc., Electrical Engineering Reference Manual, 12 pages.
Professional Publications, Inc., FE Exam, PE Exam, ARE Exam, and NCIDQ Exam Review/ Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review/ Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review/ Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review/ Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review/ Professional Engineering Licensing, Teaching an Electrical and Computer Engineering PE Exam Review Course, https://web.archive.org/web/20031223100101/http://ppi2pass.com:80/catalog/servlel/MyPpi_pg_corner-teachee.html, accessed Jul. 19, 2021, 2 pages.
Professional Publications, Inc., FE Exam, PE Exam, ARE Exam, and NCIDQ Exam Review/ Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review/ Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.
Project Registration, Moxastore, http://www.moxastore.com, Feb. 15, 2015, 2 pages.
Public Catalog of the U.S. Copyright Office for search result: electrical engineering reference manual, https://cocatalogoc.gov/cgi-bin/Pwebrecon.cgi?v1=6&ti=1, 6&Search_Arg=electrical engineering reference rnanual&Search_Code=TALL&CNT=25&PI . . . , accessed Jul. 21, 2021, 2 pages.
Publications, U.S. Department of Labor—Occupational Safety and Health Administration, https://web.archive.org/web/20150626140537/https:/Jwww.osha.gov/pls/publications/publication.html, 47 pages.
Pulsation Dampers, Coorstek, 2014, https://web.archive.org/web/20140919005733/http://coorstek.com/markets/energy_equip . . . , 2 pages.
R. Mistry et al., "Induction Motor Vibrations in view of the API 541—4th Edition," IEEE, accessed Jun. 10, 2021, 10 pages.
Random House Webster's Unabridged Dictionary, Second Edition, 2001, p. 990.
Ryan Davis, "Albright Says He'll Very Rarely Put Cases On Hold For PTAB," Law 360, https://www.law360.com/articles/1381597/print?section=ip, 2 pages.
Services—U.S. Well Services, http://uswellservices.com/services/, accessed Nov. 13, 2021, 10 pages.
Society of Automotive Engineers, Sae J1292: Automobile, Truck, Truck-Tractor, Trailer, and Motor Coach Wiring, 49 CFR 393.28, Oct. 1981, 6 pages.
Stan Gibilisco, The Illustrated Dictionary of Electronics: AudioNideo Consumer Electronics Wireless Technology—Eighth Edition, 2001, p. 667.
Standing Order Governing Proceedings—Patent Cases, in the United States District Court for the Western District of Texas, Waco Division, filed Nov. 17, 2021, 11 pages.
Stephen Cary et al., "Electric Rotating Machine Standards Part II: Magnetic Wedge Design & Monitoring Methods," 2011 IEEE, Paper No. PCIC-2011-41, 8 pages.
Steven C. Carlson, Weaponizing IPRs, Landslide, Sep. 22, 2019, 10 pages.
Stewart & Stevenson, "Stimulation Systems," 2007, 20 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
T. W. Paschall et al., "Navigating the Test Requirements of API 541 4th Edition," 2007, IEEE, Paper No. PCIC-2007-11, 12 pages.
Testimony of Judge Paul R. Michel (Rel.) United States Court of Appeals for the Federal Circuit Before the Subcommittee on Intellectual Property, U.S. Senate Committee on the Judiciary, Jun. 4, 2019, 8 pages.
The American Heritage Dictionary of the English Language, Fifth Edition, Fiftieth Anniversary, p. 911.
Thorndike Saville, The Victaulic Pipe Joint, Journal of American Water Works Association, Nov. 1922, vol. 9, No. 6, pp. 921-927.
Tim Rahill and Michael C. Fousha, "Sorting Out the Overlap," January/Feb. 2009, IEEE Industry Applications Magazine, 12 pages.
*Transcend Shipping Systems LLC* v *Mediterranean Shipping Company SA*, Case No. 6:21-cv-00040, Document 27, Order of Dismissal with Prejudice, Dec. 7, 2021, 1 page.
Transcend Shipping Systems, LLC and Hapag-Lloyd AG and Hapag-Lloyd (America) LLC, CMA CGM (America) LLC and CMA CGM SA, Mediterranean Shipping Company SA, Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, https://web.archive.org/Web/20150406152927/https://www.osha.gov/, 4 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
U.S. Well Services—Services, http://uswellservices.com/services/, accessed Nov. 13, 2021, 10 pages.
U.S. Well Services Investor and Analyst Update: Second Quarter 2021 in Review, 2021, 7 pages.
*U.S. Well Services, Inc. and U.S. Well Services, LLC* v *Halliburton Company and Cimarex Energy Co.*, Case No. 6:21-t;v-00367-ADA, Document 63, Defendants' Claim Construction Brief in Reply to U.S. Well Services, LLC's Responsive Brief, Dec. 2, 2021, 30 pages.

(56) References Cited

OTHER PUBLICATIONS

*U.S. Well Services, Inc. and U.S. Well Services, LLC* v *Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
*U.S. Well Services, Inc. and U.S. Well Services, LLC* v *Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC* v *Halliburton Company and Cimarex Energy Co.*, Case No. 6:21-cv-00367-ADA, Document 56, Defendants' Opening Claim Construction Brief, Oct. 27, 2021, 46 pages.
*U.S. Well Services, Inc. and U.S. Well Services, LLC* v *Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
Collins English Dictionary, Twelfth Edition, 2014, p. 1005.
Comprehensive Power: Power it Up, Brochure, 26 pages.
Comprehensive Power: Power it Up, Feb. 27, 2013, 28 pages.
CoorsTek Flowguard Products, 2012, 8 pages.
D. Bogh et al., "A User's Guide to Factory Testing of Large Motors: What Should Your Witness Expect," IEEE, accessed Jun. 10, 2021, 8 pages.
D. Heidel, Safety and Health Management Aspects for Handling Silica-based Products and Engineered Nanoparticles In Sequences of Shale Reservoir Stimulations Operations, Society of Petroleum Engineers, 2004, 4 pages.
D. Nedelcut et al., "On-line and Off-line Monitoring-Diagnosis System {MOS) for Power Transformers," IEEE, 2008 International Conference on Condition Monitoring and Diagnosis, Beijing, China, Apr. 21-24, 2008, 7 pages.
Dan T. Ton & Merrill A. Smith, The U.S. Department of Energy's Microgrid Initiative, 25 The Electricity J. 84 (2012), pp. 84-94.
Dani Kass, "Fintiv Fails: PTAB Uses 'Remarkably Inaccurate' Trial Dates," Nov. 2, 2021, Law 360, 1 page.
Declaration of Dr. L. Brun Hilbert, Jr., P.E., IPR2021-01538, Sep. 22, 2021, 99 pages.
Declaration of Dr. L. Brun Hilbert, P.E., IPR2021-01037 and IPR2021-01038, Jun. 21, 2021, 124 pages.
Declaration of Dr. Mark Ehsani, IPR2021-01035, Jun. 18, 2021, 188 pages.
Declaration of Dr. Mark Ehsani, IPR2021-01066, Jul. 2, 2021, 213 pages.
Declaration of Dr. Robert Durham, Case Nos. IPR2021-01033, IPR2021-01032 and IPR2021-01034, Jun. 18, 2021, p. 179 pages.
Declaration of Dr. Robert Durham, IPR2021-01065, Jun. 18, 2021, 138 pages.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YBONOS, 43 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Joel N. Broussard, Case Nos. IPR2021-01032 & IPR2021-01033, Oct. 13, 2021, 9 pages.
Declaration of Joel N. Broussard, IPR2021-01034, IPR2021-01035, IPR2021-01036, and IPR2021-01037, Oct. 20, 2021, 11 pages.
Declaration of Joel N. Broussard, IPR2021-01038, Oct. 20, 2021, 11 pages.
Declaration of Joel N. Broussard, IPR2021-01065, Oct. 20, 2021, 11 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Declaration of Robert Durham, IPR2021-01315, Aug. 12, 2021, 209 pages.
Declaration of Robert Durham, IPR2021-01316, Aug. 13, 2021, 75 pages.
Declaration of Robert Durham, IPR2022-00074, Nov. 8, 2021, 177 pages.
Declaration of Robert Schaaf, Case Nos. IPR2021-01032 and IPR2021-01033, Oct. 12, 2021, 45 pages.
Declaration of Robert Schaaf, IPR2021-01034, Oct. 20, 2021, 47 pages.
Declaration of Robert Schaaf, IPR2021-01035, Oct. 20, 2021, 51 pages.
Declaration of Robert Schaaf, IPR2021-01037, Oct. 20, 2021, 52 pages.
Declaration of Robert Schaaf, IPR2021-01038, Nov. 10, 2021, 40 pages.
Declaration of Robert Schaaf, IPR2021-01065, Nov. 10, 2021, 33 pages.
Declaration of Robert Schaaf, IPR2021-01066, Nov. 17, 2021, 43 pages.
Declaration of Robert Schaaf, IPR2021-01238, Nov. 17, 2021, 38 pages.
Declaration of Robert Schaaf, IPR2021-01315, Nov. 19, 2021, 39 pages.
Declaration of Robert Schaaf, IPR2021-01316, Nov. 19, 2021, 33 pages.
Declaration of Robert Schaaf, IPR2021-01538, Dec. 28, 2021, 40 pages.
Declaration of Robert Schaaf, IPR2021-01539, Jan. 25, 2022, 37 pages.
Declaration of Robert Schaaf, IPR2022-00074, Feb. 17, 2022, 36 pages.
Declaration of Sylvia D. Hall-Ellis, IPR2022-00610, Feb. 28, 2022, 98 pages.
Declaration of Sylvia D. Hall-Ellis, Ph.D., Case Nos. IPR2021-01032, IPR2021-01033, and IPR2021-01034, Jun. 18, 2021, 173 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
Donald G. Fink, "Standard Handbook for Electrical Engineers —Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16, 22 pages.
IEEE 100 The Authoritative Dictionary of IEEE Standards Terms Seventh Edition, 2000, 7 pages.
Elsevier, "Variable Speed Pumping—A Guide to Successful Applications," 2019, 186 pages.
Email from Michael See on Jun. 10, 2021 regarding API-541 Fourth Edition: Public Availability, 2 pages.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90, 11 pages.
Eugene A. Avallone, Marks' Standard Handbook for Mechanical Engineers: 11th Edition, 2007, p. 16-4 and 16-22.
U.S. Pat. No. 10,119,381, 24 pages.
U.S. Pat. No. 10,934,824, 24 pages.
U.S. Appl. No. 62/180,289, 32 pages.
Non-Final Office Action issued in corresponding U.S. Appl. No. 15/235,788 dated Dec. 14, 2016.
Non-Final Office Action issued in corresponding U.S. Appl. No. 15/291,842 dated Jan. 6, 2017.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Non-Final Office Action issued in corresponding U.S. Appl. No. 15/644,487 dated Nov. 13, 2017.

(56) References Cited

OTHER PUBLICATIONS

Non-Final Office Action issued in U.S. Appl. No. 14/881,535 mailed Jul. 21, 2021.
Non-Final Office Action issued in U.S. Appl. No. 16/404,283 mailed Jul. 21, 2021.
Non-Final Office Action issued in U.S. Appl. No. 16/871,928 mailed Aug. 25, 2021.
Non-Final Office Action issued in U.S. Appl. No. 16/901,774 mailed Sep. 14, 2021.
Non-Final Office Action issued in U.S. Appl. No. 16/943,727 mailed Aug. 3, 2021.
Non-Final Office Action issued in U.S. Appl. No. 17/060,647 mailed Sep. 20, 2021.
Non-Final Office Action issued in U.S. Appl. No. 14/881,535 mailed May 20, 2020.
Non-Final Office Action issued in U.S. Appl. No. 15/145,443 mailed May 8, 2020.
Non-Final Office Action issued in U.S. Appl. No. 16/152,695 mailed Mar. 3, 2020.
Non-Final Office Action issued in U.S. Appl. No. 16/458,696 mailed May 22, 2020.
Non-Final Office Action issued in U.S. Appl. No. 16/564,186, mailed Oct. 15, 2021.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office Action Mailed Aug. 31, 2020 in U.S. Appl. No. 16/167,083.
Non-Final Office Action mailed Dec. 23, 2019 in related U.S. Appl. No. 16/597,008.
Non-Final Office Action mailed Dec. 6, 2019 in related U.S. Appl. No. 16/564,186.
Non-Final Office Action mailed Feb. 12, 2019 in related U.S. Appl. No. 16/170,695.
Non-Final Office Action mailed Jan. 10, 2020 in related U.S. Appl. No. 16/597,014.
Non-Final Office Action mailed Jan. 29, 2021 in U.S. Appl. No. 16/564,185.
Non-Final Office Action mailed Jan. 4, 2021 in U.S. Appl. No. 16/522,043.
Non-Final Office Action mailed Mar. 6, 2019 in related U.S. Appl. No. 15/183,387.
Non-Final Office Action Mailed Sep. 2, 2020 in U.S. Appl. No. 16/356,263.
Non-Final Office Action Mailed Sep. 29, 2020 in U.S. Appl. No. 16/943,727.
Non-Final Office Mailed Oct. 26, 2020 in U.S. Appl. No. 15/356,436.
Non-Final Office Mailed Oct. 5, 2020 in U.S. Appl. No. 16/443,273.
Notice of Allowance and Notice of Allowability issued in U.S. Appl. No. 15/829,419 mailed Jul. 26, 2021.
Notice of Allowance issued in corresponding U.S. Appl. No. 14/622,532 dated Mar. 27, 2017.
Notice of Allowance issued in corresponding U.S. Appl. No. 15/217,040 dated Mar. 28, 2017.
Notice of Allowance mailed Apr. 23, 2019 in corresponding U.S. Appl. No. 15/635,028.
Notice of Allowance mailed Jan. 9, 2020 in related U.S. Appl. No. 16/570,331.
Nportia5250, Moxastore, http://www.moxastore.com/NPORTIA5250_p/nportia5250.htm.
Occupational Safety and Health Administration—Home, United States Department of Labor, https://web.archive.org/web/20120722160756/http://www.osha.gov/, accessed Jun. 13, 2021, 2 pages.
Office Action dated Apr. 10, 2018 in related U.S. Appl. No. 15/294,349.
Office Action dated Apr. 2, 2018 in related U.S. Appl. No. 15/183,387.
Office Action dated Jul. 25, 2018 in related U.S. Appl. No. 15/644,487.
Office Action dated May 29, 2018 in related U.S. Appl. No. 15/235,716.
Office Action dated Oct. 4, 2018 in related U.S. Appl. No. 15/217,081.
Office Action mailed Aug. 19, 2019 in related U.S. Appl. No. 15/356,436.
Office Action mailed Dec. 12, 2018 in related U.S. Appl. No. 16/160,708.
Office Action mailed Jan. 30, 2019 in related Canadian Patent Application No. 2,936,997.
Office Action mailed Jun. 7, 2019 in corresponding U.S. Appl. No. 16/170,695.
Office Action mailed Mar. 1, 2019 in related Canadian Patent Application No. 2,943,275.
*U.S. Well Services, Inc. and U.S. Well Services, LLC* v *Halliburton Company and Cimarex Energy Co.*, Case No. 6:21-cv-00367-ADA, Plaintiffs Disclosure of Asserted Claims and Preliminary Infringement Contentions, Jul. 12, 2021, 9 pages.
U.S. Well Services, Inc. files suit against Halliburton Company and Cimarex Energy Co. for patent infringement, Apr. 5, 2021, PR Newswire, https://www.prnewswire.com/news-releases/us-well-services-inc-files-suit-against-halliburton-company-and-cimarex-energy-co-for-patent-infringement-301270118.html, 2 pages.
*U.S. Well Services, Inc.* v *Halliburton Company*, Case No. 6:21-cv-00367-ADA, Civil Docket, accessed Dec. 13, 2021, 14 pages.
*U.S. Well Services, Inc.* v *Halliburton Company*, Case No. 6:21-cv-00367-ADA, Civil Docket, accessed Dec. 17, 2021, 14 pages.
*U.S. Well Services, Inc.* v *Halliburton Company*, Civil Docket for Case# 6:21-cv-00367-ADA, https://ecf.txwd.uscourts.gov/cgi-bin/DktRpt.pl?190912742001885-L_1_0-1, Accessed Nov. 29, 2021, 13 pages.
*U.S. Well Services, Inc., and U.S. Well Services, LLC* v *Halliburton Company, Cimarex Energy Co., Halliburton Energy Services, Inc., and Halliburton US Techologies, Inc.*, Case No. WA:21-CV-00367-ADA, Document 61, Order Resetting Markman Hearing, Dec. 8, 2021, 1 page.
*U.S. Well Services, Inc., and U.S. Well Services, LLC* v *Halliburton Company, Cimarex Energy Co., Halliburton Energy Services, Inc., and Halliburton US Techologies, Inc.*, Case No. WA:21-CV-00367-ADA, Document 61, Order Setting Markman Hearing, Nov. 29, 2021, 1 page.
*U.S. Well Services, LLC* v *Tops Well Services, LLC and Honghua America, LLC*, Case No_ 3:19-cv-00237, Document 1, Plaintiff's Original Complaint, 63 pages.
*U.S. Well Services, LLC* v *Tops Well Services, LLC and Honghua America, LLC*, Case No_ 3:19-cv-00237, Document 72, Plaintiff's Opening Claim Construction Brief, Apr. 24, 2020, 37 pages.
*U.S. Well Services, LLC* v *Tops Well Services, LLC and Honghua America, LLC*, Case No_ 3:19-cv-00237, Document 72-9, Declaration of Dr. Robert Schaaf- part 3, Apr. 24, 2020, 47 pages.
*U.S. Well Services, LLC* v *Tops Well Services, LLC and Honghua America, LLC*, Case No_ 3:19-cv-00237, Document 90, Plaintiff's Opposition to Defendants' Motion for Summary Judgment of Invalidity under 35 USC 112, 30 pages.
*U.S. Well Services, LLC* v *Tops Well Services, LLC*, Case No. 3:19-cv-237, Document 135, Order, Sep. 22, 2021, 2 pages.
UK Power Networks—Transformers to Supply Heat to Tate Modern—from Press Releases May 16, 2013.
Victaulic Couplings Vibration Attenuation Characteristics, Victaulic, Publication 26.04, Oct. 2014, 5 pages.
Wire Rope Isolator Technologies, Enidine, Dec. 2011, 78 pages.
Woodbury et al., "Electrical Design Considerations for Drilling Rigs," IEEE Transactions on Industry Applications, vol. 1A-12, No. 4, Jul./Aug. 1976, pp. 421-431.
World's Best Swivel Joints, Flowvalve, 2013, https://web.archive.org/web/20150117041757/http://www.flowvalve.com:80/swivels, 10 pages.
Zeus Electric Pumping Unit, Halliburton, http://www.halliburton.com/en/products/zeus-electric-pumping-unit, 2021, 4 pages.
International Search Report and Written Opinion mailed in PCT/US20/67146 mailed Mar. 29, 2021.
International Search Report and Written Opinion mailed in PCT/US20/67523 mailed Mar. 22, 2021.

(56) References Cited

OTHER PUBLICATIONS

International Search Report and Written Opinion mailed in PCT/US20/67526 mailed May 6, 2021.
International Search Report and Written Opinion mailed in PCT/US20/67528 mailed Mar. 19, 2021.
International Search Report and Written Opinion mailed in PCT/US20/67608 mailed Mar. 30, 2021.
International Search Report and Written Opinion mailed in PCT/US2020/066543 mailed May 11, 2021.
International Search Report and Written Opinion mailed Jan. 2, 2019 in related PCT Patent Application No. PCT/US18/54542.
International Search Report and Written Opinion mailed Jan. 2, 2019 in related PCT Patent Application No. PCT/US18/54548.
International Search Report and Written Opinion mailed Jan. 2, 2020 in related PCT Application No. PCT/US19/55325.
International Search Report and Written Opinion mailed Jan. 4, 2019 in related PCT Patent Application No. PCT/US18/57539.
International Search Report and Written Opinion mailed Jul. 9, 2019 in corresponding PCT Application No. PCT/US2019/027584.
International Search Report and Written Opinion mailed Mar. 5, 2019 in related PCT Application No. PCT/US18/63970.
International Search Report and Written Opinion mailed Nov. 26, 2019 in related PCT Application No. PCT/US19/51018.
International Search Report and Written Opinion mailed Sep. 11, 2019 in related PCT Application No. PCT/US2019/037493.
International Search Report and Written Opinion Mailed Sep. 3, 2020 in PCT/US2020/36932.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.
J. Malinowski et al., "Petrochemical Standards A Comparison Between IEEE 841-2001, API 541, and API 547," 2004, IEEE, Paper No. PCIC-2004-22, 8 pages.
Janice Hoppe-Spiers, "Deploying Change," Energy & Mining International, Spring 2017, http://www.emi-magazine. com, 5 pages.
Jim Harris, "U.S. Well Services LLC—Energy and Mining Magazine," Energy & Mining International, Oct. 12, 2021, https://www.emi-magazine.com/sections/profiles/1221-US-well-services-llc, 3 pages.
Jodi Shafto, "Growth in electric-tracking fleets stunted by tight producer budgets," Aug. 6, 2019, S&P Global Market Intelligence, https://wwww.spglobal.com/marketintelligence/en/news-insights/latest-news-headlines/growth-in-electric-fracking-fleets-stunted-by-tight-producer-budgets, accessed Sep. 16, 2021, 4 pages.
John A. Camera, PE, Electrical Engineering Reference Manual for the Electrical and Computer PE Exam, Sixth Edition, 2002, 17 pages.
John Daniel, "8.30 DEP Industry Observations: New Flac Fleet; New Fleet Designs Forthcoming," Daniel Energy Partners, Aug. 30, 2020, 13 pages.
Karim, "Duel Fuel Diesel Engines," (2015), Taylor & Francis, pp. 62-63, Retrieved from https://app.knovel.comlhotlink/toclid:kpDFDE0001/dual-fueal-diesel-engines/duel-fuel-diesel-engines (Year 2015).
Katsuhiko Ogata, Modern Control Engineering: Third Edition, 1997, 2 pages.
*Kirsch Research and Development, LLC* v *Tarco Specialty Products, Inc.*, Case No. 6:20-cv-00318-ADA, Document 62, Memorandum Opinion and Order Granting Defendant's Opposed Motion to Stay Pending Inter Partes Review of he '482 Patent [ECF No. 57], Oct. 4, 2021, 6 pages.
Kroposki et al., Making Microgrids Work, 6 IEEE Power and Energy Mag. 40, 41 (2008).
*Ledcomm LLC* v *Signfiy North America Corp., Signify Holding B.V., and Signify N.V.*, Case No. 6:20-cv-01056-ADA, Document 24, Scheduling Order, Aug. 13, 2021, 4 pages.
*LedComm LLC* v *Signify North America Corporation*, Case No. 6:20-cv-01056-ADA, Civil Docket, accessed Dec. 8, 2021, 11 pages.
Lionel B. Roe, Practices and Procedures of Industrial Electrical Design, 1972, McGraw-Hill, Inc., Chapter 2: The Basic Electric System, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
Liz Hampton, "Low-cost tracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Luis Gamboa, "Variable Frequency Drives in Oil and Gas Pumping Systems," Dec. 17, 2011, 5 pages.
M. E. Rahman et al., "Wire rope isolators for vibration isolation of equipment and structures—A review," IOP Conference Series Materials Science and Engineering, Apr. 2015, 12 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
Maxwell James Clerk 1868, On Governors, Proc. R Soc. Land., pp. 16270-283.
Michael Quentin Morton, Unlocking the Earth: A Short History of Hydraulic Fracturing (2013), GeoExpro, vol. 10, No. 6, 5 pages.
Mike Soraghan, OSHA issues hazard alert for tracking and drilling, E&E, Dec. 10, 2014, 1 page.
Mohinder L. Nayyar, Piping Handbook Seventh Edition, McGraw-Hill Handbook, 2000, 77 pages.
Morris et al., U.S. Appl. No. 62/526,869; Hydration-Blender Transport and Electric Power Distribution for Fracturing Operation; Jun. 28, 2018; USPTO; see entire document, 18 pages.
Moxa 802.11 Ethernet to Serial, Moxastore, http://www.moxastore.com/Moxa_802_11_Wi_Fi_Ethemet_to_Serial_s/587.html, May 24, 2016, 1 page.
National Electrical Manufacturers Association, Nema Ics 61800-4 Adjustable Speed Electrical Power Drive Systems, bart 4: General Requirements—Rating Specifications for A.C. Power Drive Systems above 1000 V a.c. and Not Exceeding 35 kV, 2004 22 pages.
Non-Final Office Action issued in corresponding U.S. Appl. No. 14/622,532 dated Aug. 5, 2015.
Non-Final Office Action issued in corresponding U.S. Appl. No. 14/622,532 dated May 17, 2016.
Non-Final Office Action issued in corresponding U.S. Appl. No. 14/881,535 dated Oct. 6, 2017.
Non-Final Office Action issued in corresponding U.S. Appl. No. 14/884,363 dated Sep. 5, 2017.
Non-Final Office Action issued in corresponding U.S. Appl. No. 15/145,414 dated Nov. 29, 2017.
Non-Final Office Action issued in corresponding U.S. Appl. No. 15/145,443 dated Feb. 7, 2017.
Non-Final Office Action issued in corresponding U.S. Appl. No. 15/145,491 dated May 15, 2017.
Non-Final Office Action issued in corresponding U.S. Appl. No. 15/145,491 on Sep. 12, 2016.
Non-Final Office Action issued in corresponding U.S. Appl. No. 15/217,040 dated Nov. 29, 2016.
"Clean Fleet Reduces Emissions by 99% at Hydraulic Fracturing Sites," Fluid Power Journal, https://fluidpowerjoumal.com/clean-fleet-reduces-emissions/, accessed Sep. 22, 2021, 5 pages.
"Game-changing hydraulic fracturing technology, reduces emissions by 99%," Intrado Globe News Wire, Oct. 1, 2014, https://www.globenewswire.com/fr/news-release-2014/10/01/670029/10100696/en/Game-changing-hydraulic-fracturing-technology-reduces-emissions-by-99.html, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
"Griswold Model 811 Pumps: Installation, Operation and Maintenance Manual, ANSI Process Pump," 2010, 60 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.

(56) References Cited

OTHER PUBLICATIONS

"Heat Exchanger" (https://en.wikipedia.org/w/index.php?title=Heat_exchanger&oldid=89300146) Dec. 18, 2019 Apr. 2019 (Apr. 18, 2019), entire document, especially para (0001).
"Kerr Pumps & FlowVale Awards for Excellence in Well Completion, Northeast 2017—Awarded to: U.S. Well Services,' https://www.oilandgasawards.com/winner/northeast-2017-kerr-pumps-flowvale-awards..", accessed Oct. 5, 2021, 4 pages.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
Pater, "Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
"Process Burner" (https://www.cebasrt.com/productsloii-gaslprocess-bumer) 06 Sep. 6, 2018 (Sep. 6, 2018), entire document, especially para (Burners for refinery Heaters).
"SainSmart TCP/IP Ethernet to Serial RS232 RS485 Intelligent Communication Converter," SainSmart, http://www.amazon.com/SainSmart-Ethemet-Intelligent-Communication-Converter/dp/B008BGLUHW, Aug. 17, 2014, 4 pages.
"Screenshot of USWS Clean Fleet System Video," 1 page.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.
"StarTech.com 1 Port RS232 Serial to IP Ethernet Converter {NETRS2321P)," StarTech, http://www.amazon.com/StarTech-com-Serial-Ethernet-Converter-NETRS2321P/dp/B0OFJEHNSO, Oct. 9, 2014, 4 pages.
"TCP/IP Ethernet to Serial RS232 RS485 RS422 Converter," Ate, http://www.amazon.com/Ethemet-Serial-RS232-RS485-Converter/dp/B00ATV2DX2, Feb. 1, 2014, 2 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
"Water and Glycol Heating Systems" (https://www.heat-inc.com/wg-series-water-glycol-systems/) Jun. 18, 2018 (Jun. 18, 2018), entire document, especially WG Series Water Glycol Systems.
49 C.F.R Part 393 {Oct. 1, 2006), 36 pages.
A. Abbott, Crippling the Innovation Economy: Regulatory Overreach at the Patent Office, Regulatory Transparency Project, Aug. 14, 2017, 35 pages.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
A. T. Dufresne, "How reliable are trial dates relied on by the PTAB in the Fintiv analysis?" Perkins Coie, 2021, 3 pages.
About Us, Moxastore, http://www.moxastore.com/aboutus.asp, Mar. 8, 2015, 1 page.
Accommodating Seismic Movement, Victaulic Company, 2015, https://web.archive.org/web/20150412042941/http://www.victaulic.com:80/en/businesses-solutions/solutions/accommoda . . . , 2 pages.
Affidavit of Duncan Hall, Internet Archives on Jun. 7, 2021, https://web.archive.org/web/20120917102614/http:/www.quincieoilfield.com/pdf/3.0%20Gardner"/o20Denver/2500/GD2500Q%200p%20&%20Service%20Manual.pdf, 76 pages.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Albone, "Mobile Compressor Stations for Natural Gas Transmission Service," ASME 67-GT-33, Turbo Expo, Power for Land, Sea and Air, vol. 79887, p. 1-10, 1967.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
America Invents Act, H.R. Rep. No. 112-98, Jun. 1, 2011, 165 pages.
American Petroleum Institute, "Form-wound Squirrel-Cage Induction Motors—500 Horsepower and Larger," Jun. 2004, Fourth Edition, ANSI/API Standard 541-2003, 88 pages.
Approved American National Standard, ANSI/NEMA MG Jan. 2011, American National Standard Motors and Generators, Dec. 9, 2021, 636 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
Austin H. Bonnett, "Root Cause Failure Analysis for AC Induction Motors in the Petroleum and Chemical Industry," 2010, IEEE, Paper No. PCIC-2010-43, 13 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Bill Lockley and Barry Wood, 'What do the API Motor/Generator Features Cost and What Do They Buy You? 2010 IEEE, Paper No. PCIC-2010-22, 10 pages.
Canadian Office Action dated Jun. 22, 2018 in related Canadian Patent Application No. 2,886,697.
Canadian Office Action dated Mar. 2, 2018 in related Canadian Patent Application No. 2,833,711.
Canadian Office Action dated Sep. 28, 2018 in related Canadian Patent Application No. 2,945,281.
Canadian Office Action issued Aug. 31, 2020 in Canadian Patent Application No. 2,944,980.
Canadian Office Action issued in Canadian Application No. 3,094,768 mailed Oct. 28, 2021.
Canadian Office Action issued Sep. 22, 2020 in Canadian Application No. 2,982,974.
Canadian Office Action issued Sep. 8, 2020 in Canadian Patent Application No. 2,928,707.
Canadian Office Action mailed Jun. 20, 2019 in corresponding CA Application No. 2,964,597.
Canadian Office Action mailed May 30, 2019 in corresponding CA Application No. 2,833,711.
Canadian Office Action mailed Oct. 1, 2019 in related Canadian Patent Application No. 2,936,997.
Candian Office Action dated Apr. 18, 2018 in related Canadian Patent Application No. 2,928,711.
Carolyn Davis, "Natural Gas Finding Niche in E-Fracking, But Diesel Still Rules," Sep. 6, 2019, Natural Gas Intel, https://www.naturalgasintel.com/natural-gas-finding-niche-in-e-fracking-but-diesel-still-rules, 9 pages.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
Chiksan Original Swivel Joints, FMC, 1997, 16 pages.
U.S. Appl. No. 62/204,331, 22 pages.
U.S. Appl. No. 62/242,173, 17 pages.
U.S. Appl. No. 62/242,566, 34 pages.
U.S. Appl. No. 62/323,168, 41 pages.
U.S. Appl. No. 62/323,303, 62 pages.
U.S. Pat. No. 10,020,711, 250 pages.
U.S. Pat. No. 10,254,732, 552 pages.
U.S. Pat. No. 10,280,724, 668 pages.
U.S. Pat. No. 10,337,308, 861 pages.

(56) References Cited

OTHER PUBLICATIONS

U.S. Pat. No. 10,408,030, 401 pages.
U.S. Pat. No. 10,408,031, 734 pages.
U.S. Pat. No. 10,526,882, 845 pages.
U.S. Pat. No. 8,789,601, 159 pages.
U.S. Pat. No. 9,410,410, 263 pages.
U.S. Pat. No. 9,410,410, Excerpt—Response to Non-Final Office Action filed Feb. 3, 2016, 57 pages.
U.S. Pat. No. 9,745,840, 215 pages.
U.S. Pat. No. 9,840,901, 216 pages.
U.S. Pat. No. 9,893,500, 291 pages.
U.S. Pat. No. 9,970,278, 310 pages.
Final Office Action issued in corresponding U.S. Appl. No. 14/622,532 dated Dec. 21, 2015.
Final Office Action issued in corresponding U.S. Appl. No. 14/622,532 dated Dec. 7, 2016.
Final Office Action issued in corresponding U.S. Appl. No. 15/145,491 dated Jan. 20, 2017.
Final Office Action issued in corresponding U.S. Appl. No. 15/145,491 dated Sep. 6, 2017.
Final Office Action issued in corresponding U.S. Appl. No. 15/294,349 dated Jul. 6, 2017.
Final Office Action issued in U.S. Appl. No. 16/356,263 mailed Oct. 7, 2021.
Final Office Action mailed Feb. 4, 2021 in U.S. Appl. No. 16/597,014.
Final Office Action mailed Jan. 11, 2021 in U.S. Appl. No. 16/404,283.
Final Office Action mailed Jan. 21, 2021 in U.S. Appl. No. 16/458,696.
Gardner Denver, 3" 1502 Male Hammer Union Discharge Flange, 2005, 13 pages.
Gardner Denver, Well Servicing Pump Model GD-2500Q Quintuplex—Operating and Service Manual, Aug. 2005, 46 pages.
Gardner Denver, Well Servicing Pump Model GD-2500Q, GD-2500Q-HD, Quintuplex Pumps, Sep. 2011, 45 pages.
Goodwin, "High-voltage auxilliary switchgear for power stations," Power Engineering Journal, 1989, 10 pg. (Year 1989).
Halliburton, Halliburton All-Electric Fracturing Reducing Emissions and Cost Brochure, 2021, 6 pages.
Hart Energy, Hydraulic Fracturing Techbook, 2015, 99 pages.
Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard_alert.html, accessed Jun. 13, 2021, 5 pages.
Henry Chajet, "OSHA Issues Alert on Non-Silica Fracking Hazards," Jan. 30, 2015, National Law Review Newsroom, 2 pages.
IEEE Power Engineering Society, 112 IEEE Standard Test Procedure for Polyphase Induction Motors and Generators, 2004, 87 pages.
Industrial Safety & Hygiene News, OSHA issues hazard alert for fracking and drilling, Jan. 6, 2015, 2 pages.
Industry/Hazard Alerts, United States Department of Labor, https://web.archive.org/web/20120801064838/http://www.osha.gov:80/hazardindex.html, accessed Jun. 13, 2021, 1 page.
International Search Report and Written Opinion dated Sep. 19, 2018 in related PCT Patent Application No. PCT/US2018/040683.
International Search Report and Written Opinion issued in Application No. PCT/US2019/055323 mailed Feb. 11, 2020.
International Search Report and Written Opinion issued in PCT/US2020/023809 mailed Jun. 2, 2020.
International Search Report and Written Opinion mailed Apr. 10, 2019 in corresponding PCT Application No. PCT/US2019/016635.
International Search Report and Written Opinion Mailed Aug. 28, 2020 in PCT/US20/23821.
International Search Report and Written Opinion mailed Dec. 14, 2020 in PCT/US2020/53980.
International Search Report and Written Opinion mailed Dec. 31, 2018 in related PCT Patent Application No. bCT/US18/55913.
International Search Report and Written Opinion mailed Feb. 15, 2019 in related PCT Application No. PCT/US18/63977.
International Search Report and Written Opinion mailed Feb. 2, 2021 in PCT/US20/58906.
International Search Report and Written Opinion mailed Feb. 3, 2021 in PCT/US20/58899.
International Search Report and Written Opinion mailed Feb. 4, 2021 in PCT/US20/59834.

* cited by examiner

HIGH HORSEPOWER PUMPING CONFIGURATION FOR AN ELECTRIC HYDRAULIC FRACTURING SYSTEM

CROSS REFERENCE TO RELATED APPLICATIONS

This application is a continuation of U.S. patent application Ser. No. 16/871,928 filed May 11, 2020 titled "HIGH HORSEPOWER PUMPING CONFIGURATION FOR AN ELECTRIC HYDRAULIC FRACTURING SYSTEM," now U.S. Pat. No. 11,434,737, issued Sep. 6, 2022, which is a continuation of U.S. patent application Ser. No. 16/210,749 filed Dec. 5, 2018 titled "HIGH HORSEPOWER PUMPING CONFIGURATION FOR AN ELECTRIC HYDRAULIC FRACTURING SYSTEM," now U.S. Pat. No. 10,648,311, issued May 12, 2020, and claims priority to and the benefit of U.S. Provisional Application Ser. No. 62/594,925 filed Dec. 5, 2017 titled "HIGH HORSEPOWER PUMPING CONFIGURATION FOR AN ELECTRIC HYDRAULIC FRACTURING SYSTEM" and U.S. Provisional Application Ser. No. 62/595,411 filed Dec. 6, 2017 titled "HIGH HORSEPOWER PUMPING CONFIGURATION FOR AN ELECTRIC HYDRAULIC FRACTURING SYSTEM," the full disclosures of which are hereby incorporated herein by reference in their entireties for all purposes.

BACKGROUND

1. Technical Field

This disclosure relates generally to hydraulic fracturing and more particularly to systems and methods for configuring high horsepower pumping systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant, chemicals, and the like into the fluid, cranes, wireline units, and many other components that all perform different functions to carry out fracturing operations.

Usually in fracturing systems, the fracturing equipment runs on diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a well site. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering mobile fracturing operations.

Some electric pumping configurations have a limited horsepower (HP) range, such as between approximately 1750 HP and 2500 HP. This contrasts diesel powered pumping configurations which may include horsepower ranges between 2250 HP and 3000 HP. Fracturing operations with high horsepower configurations which desire the benefits of electric powered pumps typically supplement with smaller diesel powered configurations, which may reduce or eliminate the numerous benefits provided by electric powered pumps. Moreover, rig up times may be increased because two different types of pumping configurations are transported and installed at the well site.

SUMMARY

Applicant recognized the problems noted above herein and conceived and developed embodiments of systems and methods, according to the present disclosure, for operating electric fracturing pumps.

In an embodiment a hydraulic fracturing system for fracturing a subterranean formation includes an electric pump, arranged on a first support structure, the electric pump coupled to a well associated with the subterranean formation and powered by at least one electric motor, and configured to pump fluid into a wellbore associated with the well at a high pressure so that the fluid passes from the wellbore into the subterranean formation and fractures the subterranean formation. The system also includes support equipment, arranged on a second support structure, electrically coupled to the electric pump, wherein the support equipment includes at least a transformer for distributing power to the electric pump, the power being received from at least one generator at a voltage higher than an operating voltage of the electric pump.

In an embodiment a hydraulic fracturing system for fracturing a subterranean formation includes a first support structure, forming a pumping trailer. The first support structure includes an electric pump fluidly connected to a well associated with the subterranean formation and configured to pump fluid into a wellbore associated with the well at a high pressure so that the fluid passes from the wellbore into the subterranean formation and fractures the subterranean formation. The first support structure also includes at least one electric motor providing operational energy to the electric pump. The first support structure further includes a first support component, the first support component regulating operation of the electric pump. The system also includes a second support structure, forming a support trailer. The second support structure includes a second support component, the second support component regulating electric power transmission to the electric pump.

In an embodiment a hydraulic fracturing system for fracturing a subterranean formation includes at least one generator and at least one switch gear receiving electrical power from the generator. The system also includes an electric pump, arranged on a first support structure, the electric pump coupled to a well associated with the subterranean formation and powered by at least one electric motor arranged on the first support structure, the electric pump configured to pump fluid into a wellbore associated with the well at a high pressure so that the fluid passes from the wellbore into the subterranean formation and fractures the subterranean formation. The system also includes a transformer, arranged on a second support structure, positioned between the switch gear and at least one electric motor, the transformer reducing a voltage output from the at least one switchgear.

BRIEF DESCRIPTION OF DRAWINGS

The present technology will be better understood on reading the following detailed description of non-limiting embodiments thereof, and on examining the accompanying drawings, in which.

Figure 1:
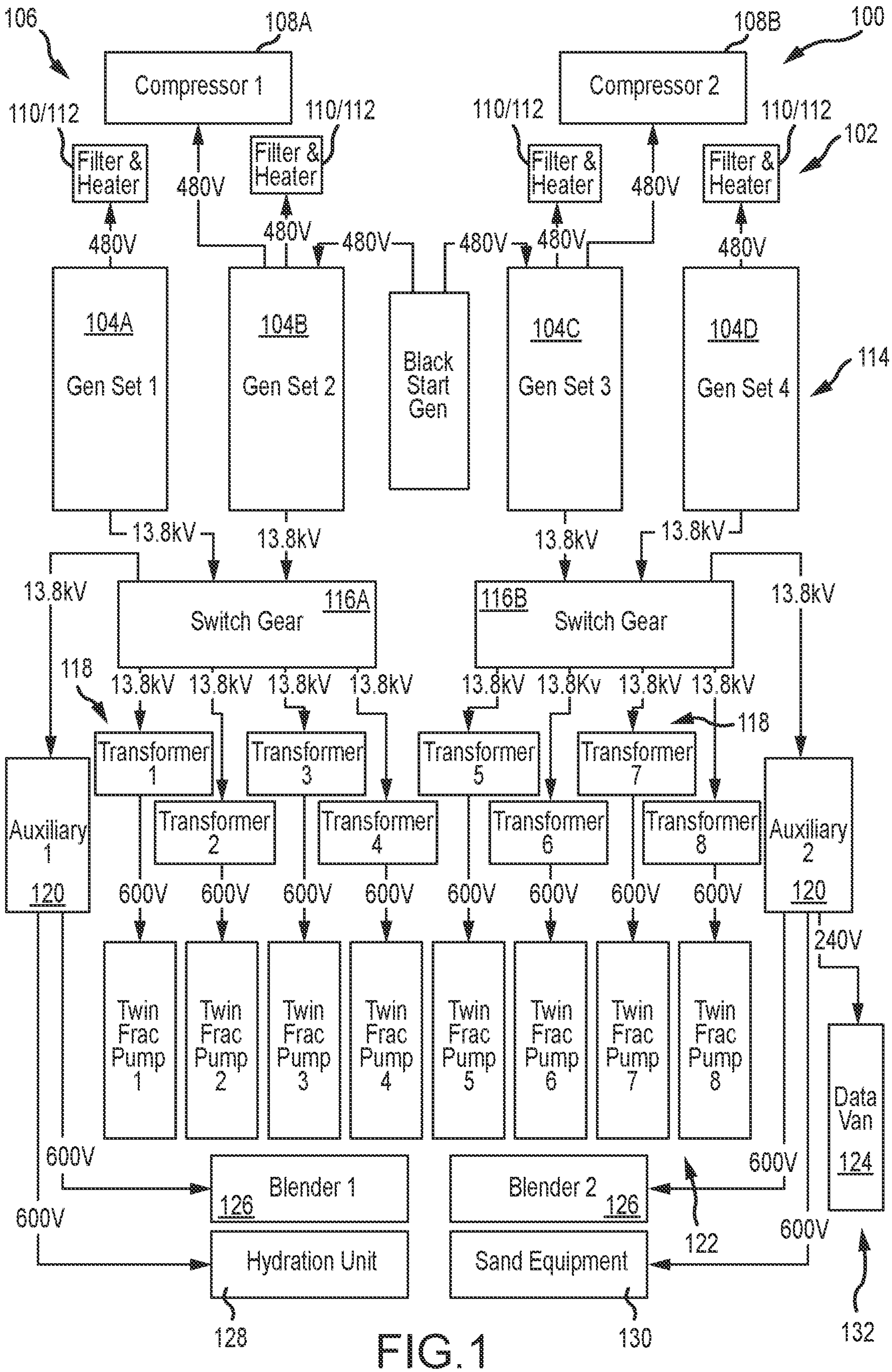
FIG. 1 is a schematic block diagram of an embodiment of a hydraulic fracturing system, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure describe systems and methods for various pump configurations to produce greater horsepower (HP) output with a smaller footprint at a well site. In certain embodiments, various components may be arranged on a common support structure, such as a trailer or skid. For example, the trailer may include a transformer, variable frequency drive (VFD), and pump. In such embodiments, the total area available for pumps on the trailer may be decreased due to the support equipment, and as a result, the horsepower output from the pump may be reduced because of its size. In various embodiments, a separate skid or trailer may be utilized for certain support components to thereby enable larger pumps or more pumps to be positioned on the pump trailer to increase the total horsepower output and reduce the number of pump trailers arranged at the well site.

Embodiments of the present disclosure describe systems and methods for pumping configurations utilizing electric powered pumps that produce horsepower greater than or equal to diesel-powered pumping configuration. As described above, diesel-powered systems are noisy and generate pollution. Moreover, transportation of fuel to well sites may be costly and availability of fuel may delay or otherwise bottleneck fracturing operations. In various embodiments, electric pumping configurations include trailers or skids with a pump and a VFD mounted on a single skid or trailer. In certain embodiments, the VFD may be moved to a separate auxiliary skid to increase the room available on the trailer or skid housing the pump. As a result, multiple pumps may be situated on the skid or trailer, or larger pumps may be situated on the skid or trailer. In various embodiments, a single trailer or skid may have a capacity for a 6000+ HP output utilizing a variety of configurations such as a single pump with multiple electric motors, a single motor powering a large pump, a large motor powering multiple electric pumps, or the like.

In various embodiments, the pumps utilized with the disclosed configurations may include non-standard fluid ends (e.g., a fluid manifold with valves and seats to isolate a suction side and high pressure discharge side without allowing back flow). By way of example only, the fluid ends may include more than 3 plungers (e.g., triplex) or more than 5 plungers (e.g., quintaplex) or plunger stroke lengths longer than 11 inches. For example, the fluid ends may be septenplex (7 plungers), novenplex (9 plungers), undenplex (11 plungers), tredenplex (13 lungers), or include any other reasonable number of plungers. Size constraints and the like have produced difficulty utilizing such pumps in other systems. However, by adjusting the position of various support equipment for the pumps, such as VFDs, transformers, and motor control centers (MCCs), the trailer or skid may have sufficient size to accommodate larger or non-standard pumps for use with hydraulic fracturing.

In various embodiments, the pumping configurations described herein may include a support skid. This support skid may include auxiliary components for operating the pumps, such as the VFDs, transformers, MCCs, and the like to thereby free up space on the skid or trailer housing the pumps for various additional different configurations, such as more pumps or larger pumps. While referred to herein as "support skids" it should be appreciated that the components associated with the support skids may be mounted on a skid or trailer. That is, the term "support skid" should not be interpreted as limiting the base or support structure to only a skid and other support structures, such as pads, trailers, truck beds, and the like may also be utilized and fall within the scope of the embodiments disclosed herein. Moreover, references to "pump trailers" should be interpreted as including embodiments where the support structure for the pumps and/or associated pumping equipment includes a trailer, a skid, a pad, a truck bed, or any other reasonable support structure.

Various embodiments utilize VFDs in order to control and monitor operation of the electric fracturing pumps. The VFDs may include soft stalls for improved operation. The soft stall allows the VFD to "disengage" the motor for a short amount of time (such as milliseconds) instead of tripping the VFD off to protect the drive and motor. Due to fluctuations in the wellhead pressure and pump fluid rate, if the VFD is near its upper limitations on torque a small fluctuation of pressure can cause the VFD to "trip" or shut down to protect itself to prevent damage. The soft stalls allow the VFD to stall temporarily then reengage the motor instead of shutting down completely. These "soft stalls" are unnoticed by the operator and are so quick that total fluid rate is not affected. This feature allows operation of the VFDs and motors at higher horsepower without fear of suffering an unexpected shutdown. Rated hydraulic horsepower (HHP) may be increased from 1,600 HP to 1,700 HP. In various embodiments, the soft stall is a software setting implemented as an executable instruction stored on a non-transitory machine readable memory and initiated by an associated processor of a control system.

FIG. 1 is a simplified block diagram of an embodiment of a hydraulic fracturing system 100. In the illustrated embodiment, a power generation section 102 includes four turbine generators 104A-D arranged to produce electrical energy at approximately 13.8 kV and generate more than approximately 20 MW of power depending on demand, size, and the like. That is, different types of generators may be arranged at the well site and produce different quantities of electrical energy. For instance, the generators may produce electrical energy at approximately 600 V, 4,160 V, or any other reasonable voltage output. Furthermore, different sizes of generators may be utilized in order to accommodate size and space restrictions at the well site. The illustrated embodiment further includes support equipment 106 for the turbine generators 104A-D, such as compressors 108, filters 110, heaters 112, and the like. It should be appreciated that other equipment, such as electronic equipment rooms and the like, have been omitted for clarity.

The illustrated embodiment further includes a power distribution section 114 including switch gears 116A, 116B for protection and distribution, as well as step down transformers 118 and auxiliary units 120. As shown, the generators 104A-D produce electrical energy at 13.8 kV for transmission to the switch gear 116A, 116B. Thereafter, the step down transformers 118 receive and convert the energy to 600 V, which is distributed to pumps 122. As shown, the auxiliary units 120 are utilized to step down the energy for the associated fracturing equipment, such as a data van 124, blender 126, a hydration unit 128, and sand equipment 130. In various embodiments, the auxiliary units may include transformers to step down the energy to 600 V, 240 V, or any other reasonable voltage output.

Continuing with FIG. 1, the illustrated embodiment further includes hydraulic fracturing equipment, such as the illustrated pumps 122, data van 124, blenders 126, hydration unit 128, and sand equipment 130. It should be appreciated that various components have been simplified and/or removed for clarity. Moreover, the embodiment illustrated in FIG. 1 is not intended to be limiting. For instance, more than 8 twin frac pumps may be arranged at the well site. Moreover, multiple data vans, blenders, sand equipment, and hydration units may be utilized. The illustrated pumps 122 are twin frac pumps. The twin frac pumps may be arranged on a common skid or trailer and receive energy from the transformers 118. It should be appreciated that the pumps 122 may be configured to operate at different voltages, such as 600 V, 13.8 kV, 4,160 V, or any reasonable voltage. Moreover, in embodiments the pumps 122 may be singular pumps mounted on a trailer or skid. However, in embodiments that utilize the twin frac pumps, the trailer or skid may include two fully independent, electrically powered fluid pumps. In various embodiments, the illustrated fleet is capable of generating approximately 16,000 HP for fracturing jobs. As will be described below, different configurations, for example of the pumps, may enable more than approximately 20,000 HP.

Figure 2:
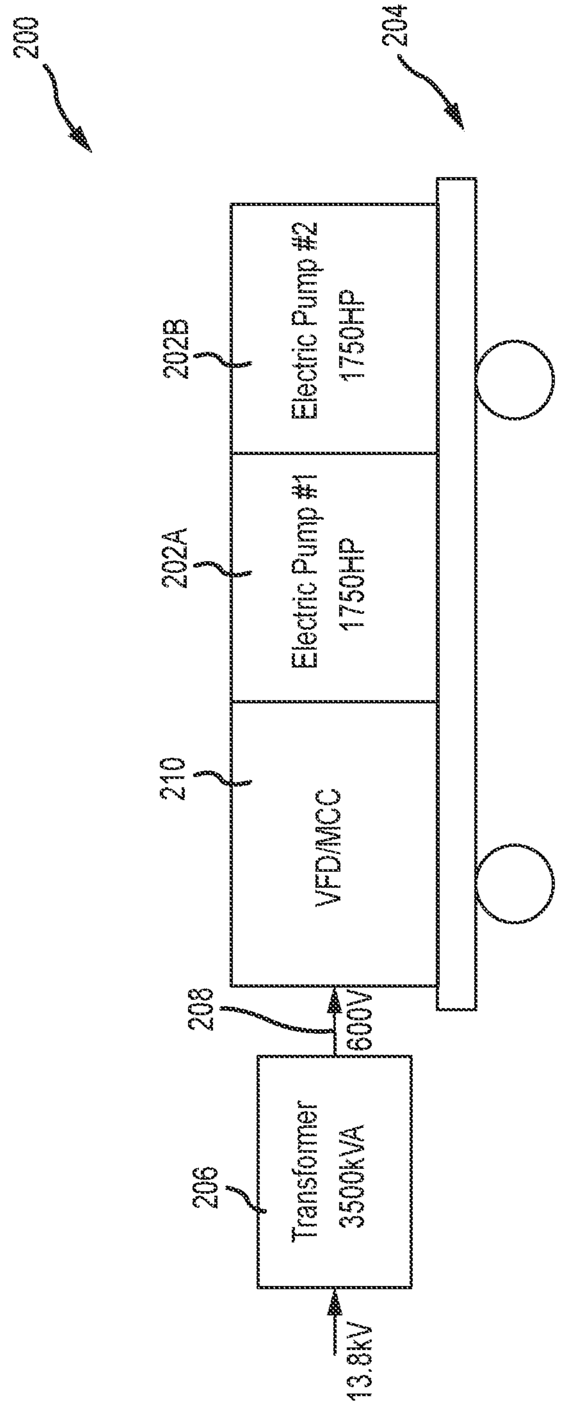
FIG. 2 is a schematic block diagram of an embodiment of a pumping configuration, in accordance with embodiments of the present disclosure.

FIG. 2 is a schematic diagram of an embodiment of a twin frac pump trailer 200. It should be appreciated that twin frac pumps 202A, 202B may also be arranged on a skid, pad, bed, or any other reasonable support structure 204. As illustrated, a transformer 206 steps down electrical energy from 13.8 kV to 600 V and may be rated for approximately 3500 kVA. The 600 V power is transmitted to the pumps 202A, 202B, for example via cabling 208, through a VFD and MCC 210. In various embodiments, the VFD and MCC 210 are arranged on the same support structure 204 (e.g., trailer, skid, pad, bed, etc.) as the dual electric fracturing pumps illustrated in FIG. 2. It should be appreciated that while the VFD and MCC 210 are illustrated as a single unit in the illustrated embodiment, in other embodiments the VFD and MCC may be separate and distinct units, which may not be both arranged on the support structure 204. The illustrated pumps 202A, 202B produce approximately 1,750 HP, which allows for the trailer to have a combined output of approximately 3,500 HP. It should be appreciated that various components have been eliminated for clarity. For example, each fluid pump 202A, 202B may include an electric motor, motor cooling equipment, a power end, a lube oil cooler, a fluid end, and the like. In embodiments, the additional equipment may be arranged on the same support structure 204. However, in various embodiments, the additional equipment may be on an auxiliary or separate support structure.

In various embodiments, hydraulic fracturing jobs may utilize upwards of 28,000 HP. Accordingly, utilizing the configuration illustrated in FIG. 2 would lead to approximately 8 twin frac pump trailers 200 at the site, as illustrated in FIG. 1. This configuration may take up significant space, which may be limited at various fracturing sites. Moreover, mobilizing and demobilizing the equipment may be time consuming. Accordingly, various embodiments disclosed herein may be utilized to produce more horsepower per pump trailer to thereby reduce the number of pump trailers at the site.

Figure 3A:
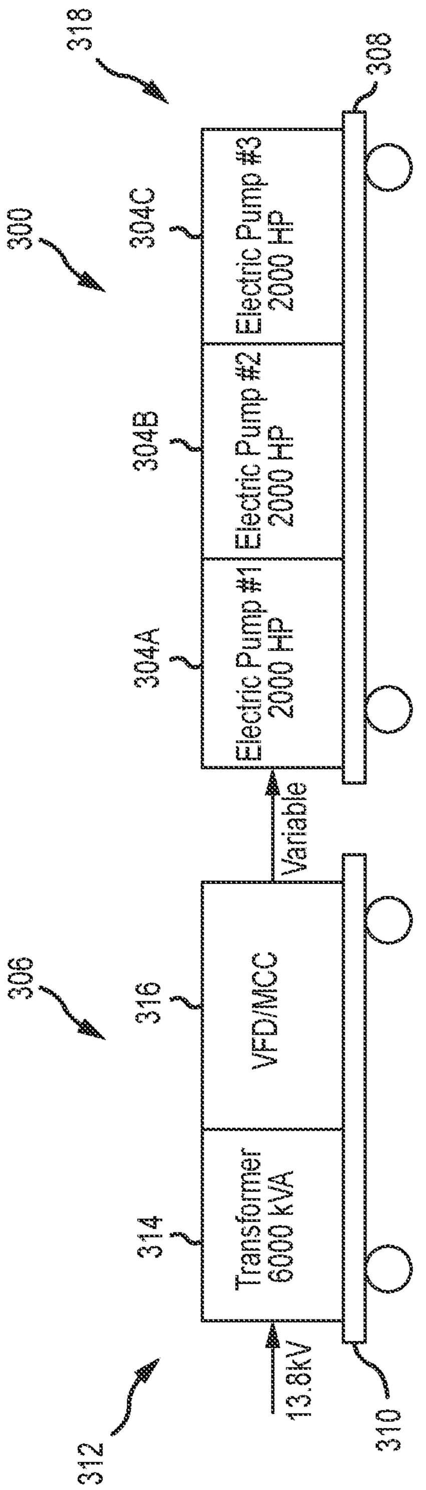
FIG. 3A is a schematic block diagram of an embodiment of a pumping configuration, in accordance with embodiments of the present disclosure.
Figure 3B:
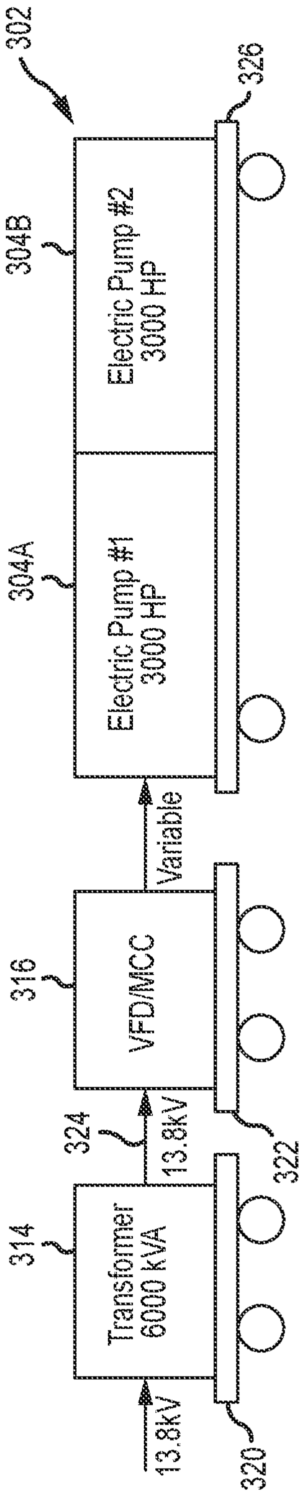
FIG. 3B is a schematic block diagram of an embodiment of a pumping configuration, in accordance with embodiments of the present disclosure.

FIGS. 3A and 3B are schematic diagrams of embodiments of frac pump trailer configurations 300, 302 which may produce approximately 6,000 HP. As shown in FIG. 3A, pumps 304A, 304B, 304C and the support equipment 306 have been separated onto two different support structures 308, 310, for example two different trailers. A first trailer 312 includes a transformer 314 for stepping down the 13.8 kV voltage. As described above, in various embodiments the voltage may be stepped down to 600 V, however it should be appreciated that different output voltages may be utilized. The first trailer 312 also includes the VFD/MCC 316 for controlling operation of the electric motor powering the pumps. As noted above, the VFD/MCC 316 may be integrated into a singular unit or may be separate and distinct units. FIG. 3A also illustrates a second trailer 318 having three electric pumps 304A-C. The illustrated pumps are rated for approximately 2,000 HP each, thereby providing a configuration to produce approximately 6,000 HP. The embodiment illustrated in FIG. 3A may include various cabling and instrumentation permanently mounted to the first trailer 312 for supporting the transformer 314 and VFD/MCC 316. As a result, connections may be simplified at the site because separate cabling and the like will not be run between the transformer 314 and the VFD/MCC 316. Moreover, simplified connections via power cables may be used to transmit power to the electric pumps 304A-C, thereby reducing the likelihood of misconnections at the well site and improving reliability.

FIG. 3B illustrates a configuration in which the transformer and VFD/MCC are on different support structures, such as different skids or trailers. For example, the illustrated transformer 314 is arranged separate from the VFD/MCC 316, for example on different support structures 320, 322. Accordingly, cabling 324 and the like may be arranged between the transformer 314 and the VFD/MCC 316 to enable transmission of electrical energy. Furthermore, illustrated on a separate support structure 326 such as a trailer or skid, is a pair of electric pumps 304A, 304B rated for approximately 3,000 HP. Because there are fewer pumps 304A, 304B on the trailer 326, compared to FIG. 3A, larger pumps may be utilized, which enables the pump trailer 302 to produce approximately 6,000 HP total. Accordingly, using the embodiments illustrated in FIGS. 3A and 3B, producing approximately 28,000 HP will utilize approximately 5 trailers, as opposed to 8, for example using the configuration of FIG. 2. As a result, the system may have a smaller footprint at the site and also have less equipment to connect, disconnect, and move.

Figure 4A:
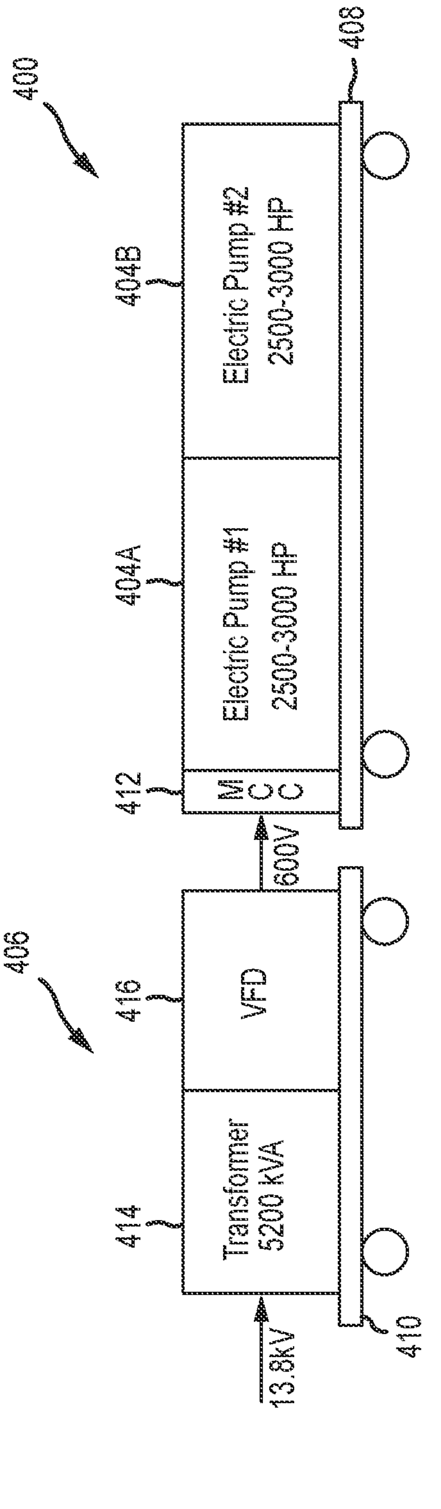
FIG. 4A is a schematic block diagram of an embodiment of a pumping configuration, in accordance with embodiments of the present disclosure.
Figure 4B:
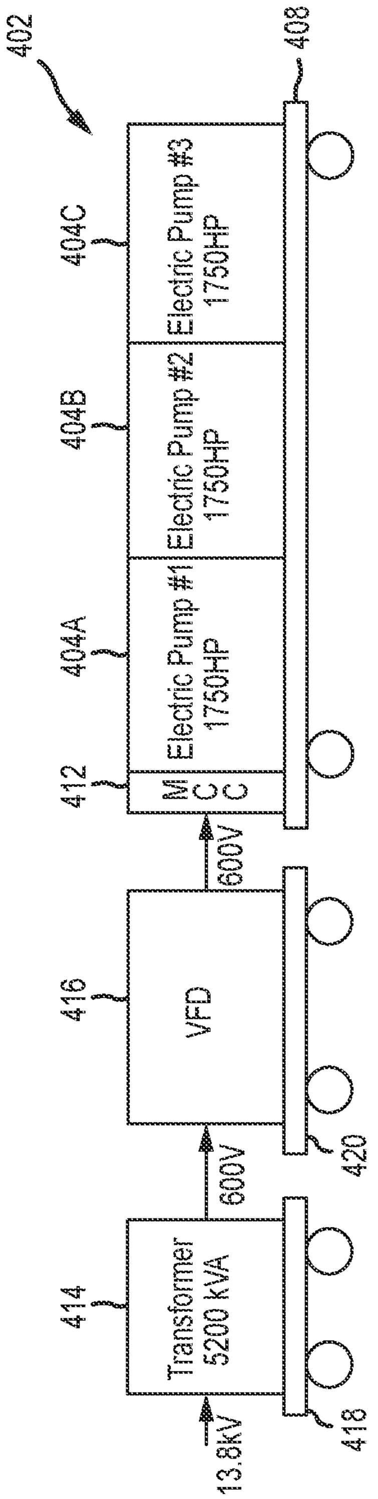
FIG. 4B is a schematic block diagram of an embodiment of a pumping configuration, in accordance with embodiments of the present disclosure.

FIGS. 4A and 4B are schematic diagrams of embodiments of frac pump trailer configurations 400, 402 which may produce approximately 5,000-6,000 HP. As shown in FIG. 4A, the pumps 404A, 404B and the support equipment 406 have been substantially separated onto two different support structures 408, 410, for example two different trailers. A notable difference from FIG. 3A is the inclusion of an MCC 412 on the trailer 408 supporting the pair of pumps 404A, 404B, rather than on the trailer 410 for the support equipment 406. While this configuration occupies additional space on the pump trailer, it enables improved and efficient cable management and increase electrical safety. With the MCC 412 on the pump trailer 408, only power and some communication cables will be used between the auxiliary trailers and the pump trailers. In various embodiments, the MCC 416 will include breakers to distribute power to equipment components both large and small. In various embodiments, the equipment may include lights, heaters, blowers, small pumps, control computers, motors, and the like.

In the illustrated embodiment, the support structure 410 with the support equipment 406 (which may be referred to as a support trailer) includes a transformer 414 for stepping down the 13.8 kV energy. As described above, in various embodiments the voltage may be stepped down to 600 V, however it should be appreciated that different output voltages may be utilized. The support trailer also includes a VFD 416 for controlling operation of the electric motor or motors (not shown) powering the pumps 404A, 404B. FIG. 4A also illustrates the support structure 408 with the pumps 404A, 404B (which may be referred to as a pump trailer), as described above. The pump trailer includes the pair of electric pumps 404A, 404B and the MCC 412. The illustrated pumps 404A, 404B are rated for approximately 2,500-3,000 HP each, thereby providing a configuration to produce approximately 5,000-6,000 HP. As described above, because there are only two pumps on the trailers the pumps may be larger and therefore capable of producing additional power output.

FIG. 4B illustrates the configuration in which the transformer 414 and VFD 416 are on different support structures, 418, 420 such as different skids or trailers. Additionally, the MCC 412 is mounted on the same trailer 408 as the pumps 404A-C, as described above with respect to FIG. 4A. For example, the illustrated transformer 414 is arranged separate from the VFD 416, for example on different support structures 418, 420. Accordingly, cabling and the like may be arranged between the transformer 414 and the VFD 416 to enable transmission of electrical energy. Furthermore, illustrated on the separate support structure 408, such as a trailer or skid, is three electric pumps 404A-C rated for approximately 1,750 HP and the MCC 412. Because there are more pumps 404A-C on the trailer 408, each pump 404A-C may be smaller than configurations with fewer pumps. Additionally, as described above, the MCC 412 occupies space on the trailer, but provides improved and efficient cabling. The embodiment illustrated in FIG. 4B may produce approximately 5,250 HP. Accordingly, using the embodiments illustrated in FIGS. 4A and 4B, producing approximately 28,000

HP will utilize approximately 5 or 6 trailers, as opposed to 8. As a result, the system may have a smaller footprint at the site and also have less equipment to connect, disconnect, and move.

Figure 5:
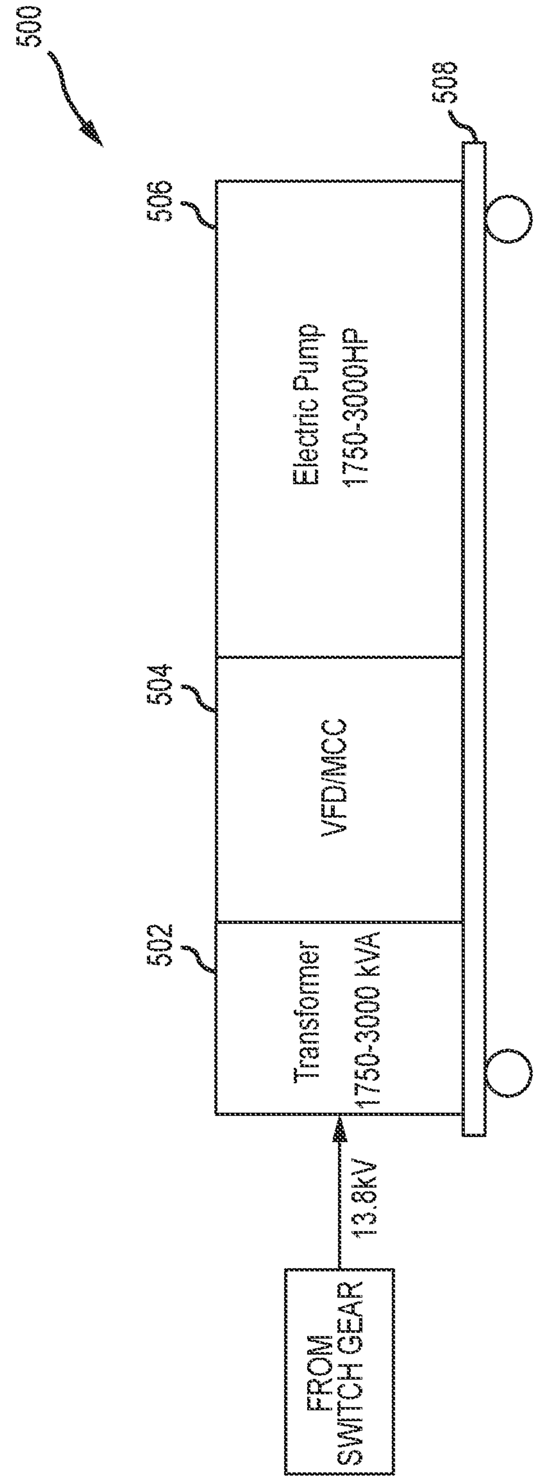
FIG. 5 is a schematic block diagram of an embodiment of a pumping configuration, in accordance with embodiments of the present disclosure.

FIG. 5 is a schematic diagram of an embodiment of a frac pump trailer configuration 500 which may produce approximately 3,000 HP. In the illustrated embodiment, a transformer 502, VFD/MCC 504, and electric pump 506 are all located on a common support structure 508, such as a trailer or skid. Because of the support equipment arranged on the trailer 508, the size of the pump 506 may be reduced, and therefore produces between approximately 1,750 and 3,000 HP. The configuration illustrated in FIG. 5 enables permanent cabling to be installed on the trailer to facilitate connection at the well site. For example, power may be transmitted to the trailer from the switch gear, as illustrated in FIG. 5. Accordingly, the embodiment illustrated in FIG. 5 provides a compact and simplified configuration at the well site.

Figure 6:
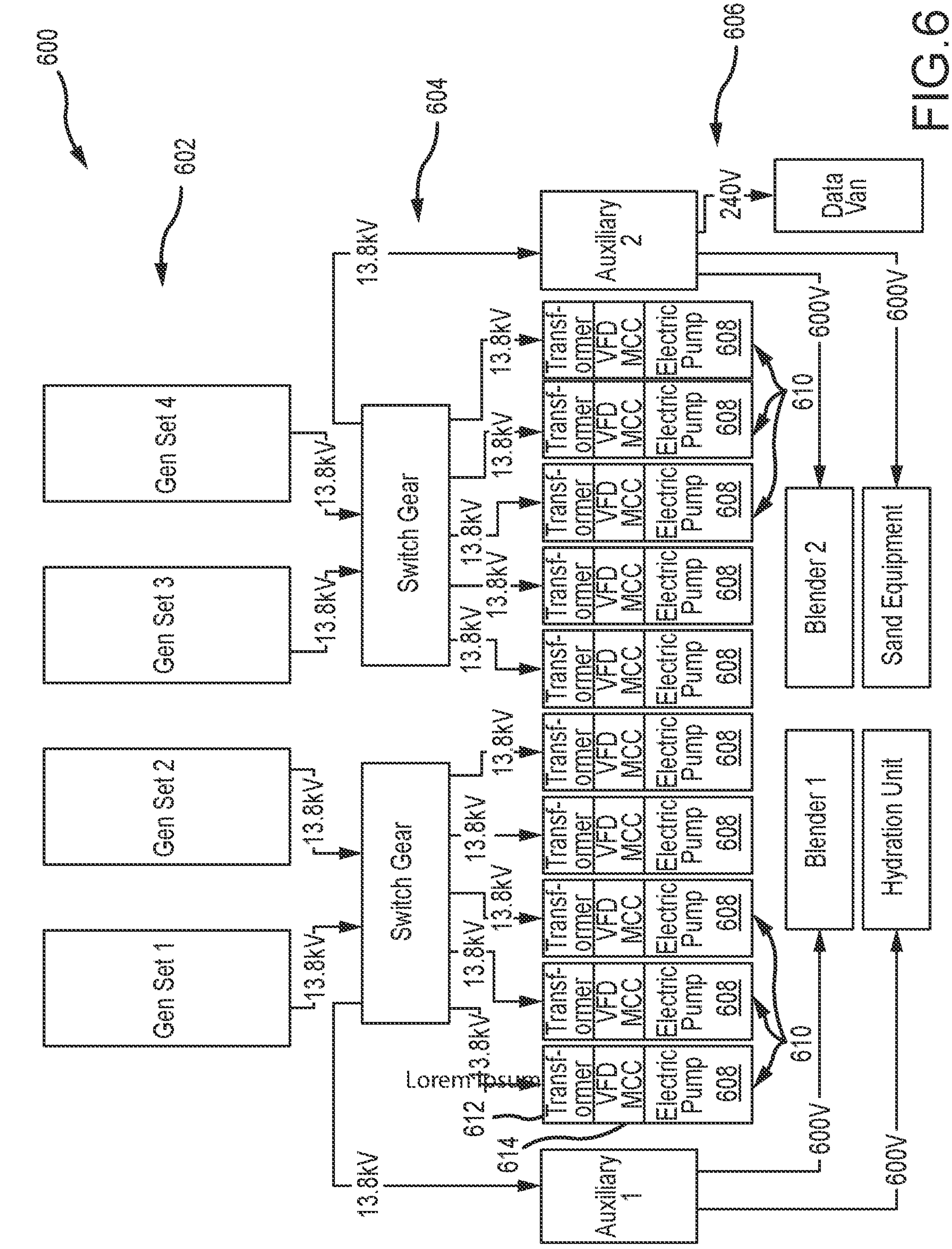
FIG. 6 is a schematic block diagram of an embodiment of a hydraulic fracturing system, in accordance with embodiments of the present disclosure.

FIG. 6 is a schematic diagram of an embodiment of a hydraulic fracturing system 600 including a power generation section 602, a power distribution section 604, and hydraulic fracturing equipment 606. The illustrated embodiment includes hydraulic fracturing pumps 608, for example mounted on a common trailer or skid 610 with a transformer 612 and VFD and MCC 614, in a configuration to produce approximately 30,000 HP. As illustrated, there are 10 different frac pump trailers 610, which may have the same configuration illustrated in FIG. 5. By incorporating the embodiment illustrated in FIG. 5, the separate transformers illustrated in FIG. 1 have been removed because the transformers 612 are already included with the pump trailers 610. Accordingly, a more compact configuration may be arranged at the well site.

Figure 7:
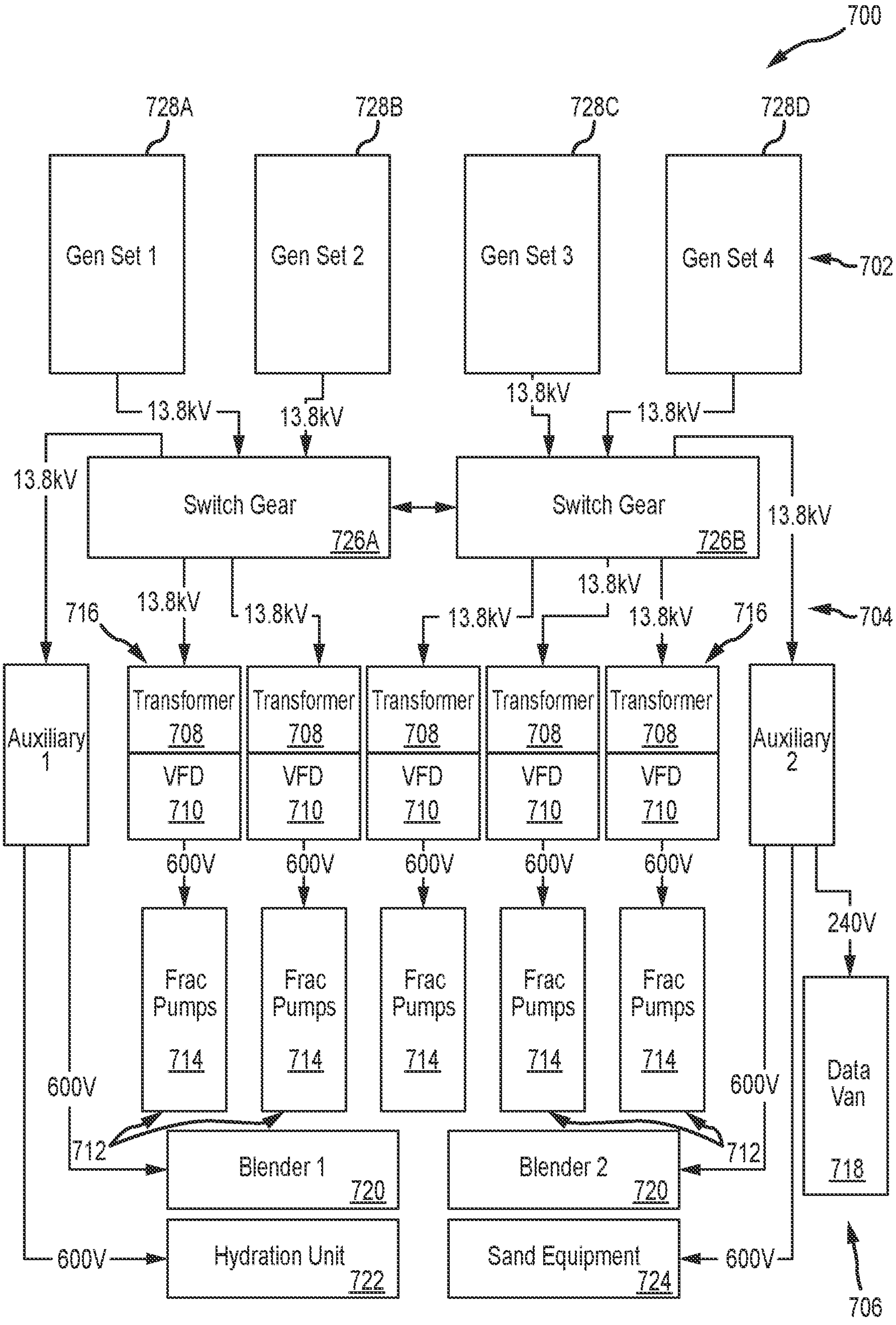
FIG. 7 is a schematic block diagram of an embodiment of a hydraulic fracturing system, in accordance with embodiments of the present disclosure.

FIG. 7 is a schematic diagram of an embodiment of a hydraulic fracturing system 700 including a power generation section 702, a power distribution section 704, and hydraulic fracturing equipment 706, as described in detail above. The illustrated embodiment may produce approximately 30,000 HP. As shown, a transformer 708 and VFD 710 are removed from the frac pump trailers 712 that support one or more pumps 714 and are supported separately, for example via a separate trailer or skid 716. In various embodiments, the MCC may be incorporated into the trailer 712 supporting the pumps 714 or the trailer 716 supporting the transformer 708 and VFD 710, as described above. As shown, the illustrated configuration includes 5 frac pump trailers, and in various embodiments a single large pump on the frac pump trailer 712, a pair of frac pumps, three frac pumps, or any reasonable number in order to produce the particularly selected amount of horsepower. The illustrated embodiment further includes the auxiliary units for supplying electrical energy to the support equipment, such as the data van 718, blenders 720, hydration unit 722, and sand equipment 724, as described above.

Further illustrated in the power distribution section 704 is load sharing between the switch gear 726 to keep the load balanced across the generators 728A-D. This balance may be achieved even though there are an unequal number of pump trailers utilized in the system. That is, a first switch gear 726A may transmit energy to two different frac pump trailers and a second switch gear 726*b* may transmit energy to three different frac pump trailers.

It should be appreciated that various embodiments of the components of the present disclosure may utilize a variety of equipment in order to achieve a desired end. For example, the pumps described herein may be magnetic coil, reciprocating, centrifugal, positive displacement, rotary (e.g., gear pumps, screw pumps, rotary vane pumps), progressing cavity, roots-type, peristaltic, plunger, hydraulic ram, velocity, or any other reasonable type of pumps. Moreover, the VFDs may be housed within an enclosure having an internal air conditioned space for technicians. In various embodiments, the VFD enclosures may no longer be a "house" and rather be panels that are weather and oil-field condition proof (e.g., blast proof, water proof, dust proof, etc.). Accordingly, the size of the housing may be decreased as the technicians may access the exterior panels while standing beside the trailers or skids.

Various embodiments may include a support skid, trailer, or body load, as described above, to free up space on the pump trailers (e.g., pump skid, pump pad, etc.) for additional pumps and/or larger pumps. As described above, it should be appreciated that references to a "support skid" may also refer to a support trailer, a support pad, a body load, or any other reasonable configuration. By way of example only, the support skid may include a main transformer, such as a step down transformer to take power down from 13.8 kV on the primary side (e.g., inlet) to 4,160 V on the secondary side (e.g., outlet). Furthermore, the transformer and/or support skid may include a bus, which may be common or separate, to feed the VFD and the MCC.

Figure 8A:
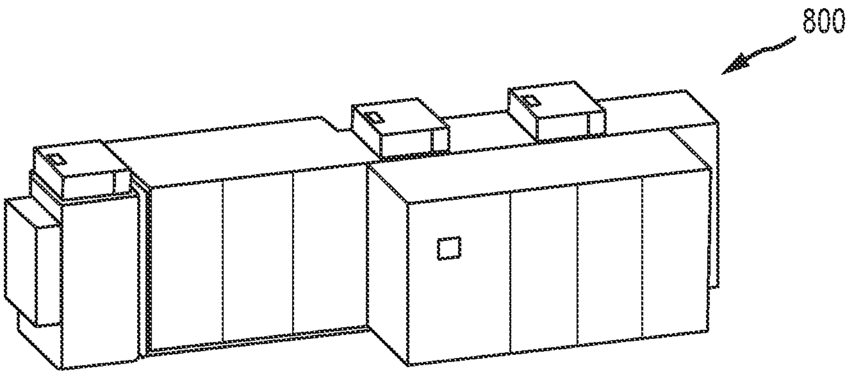
FIG. 8A is a schematic perspective view of an embodiment of an enclosure, in accordance with embodiments of the present disclosure.
Figure 8B:
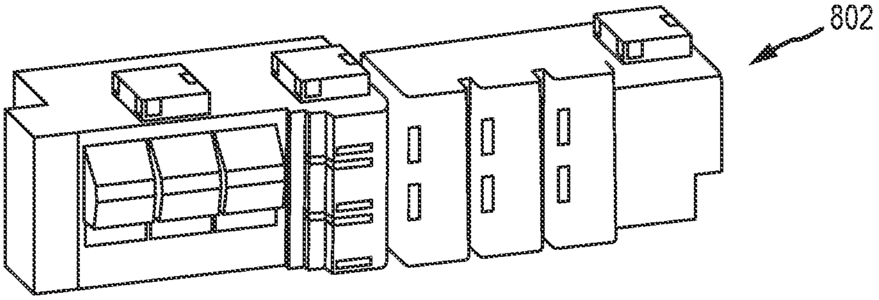
FIG. 8B is a schematic perspective view of an embodiment of an enclosure, in accordance with embodiments of the present disclosure.

FIGS. 8A and 8B are schematic perspective views of embodiments of enclosures 800, 802 for VFD assemblies. As described above, in various embodiments the VFDs may be housed within enclosures that include weather-proof and/or oil field condition-proof configurations, such as being blast proof or dust proof. The illustrated embodiment includes an outdoor medium voltage adjustable speed drive and an advanced enclosure design and power section topology. Namely, the illustrated embodiments are particularly designed for mounting in remote locations, such as harsh environments including desert or oil-field conditions. It should be appreciated that alternative embodiments may not have an integrated outdoor enclosure.

Figure 9:
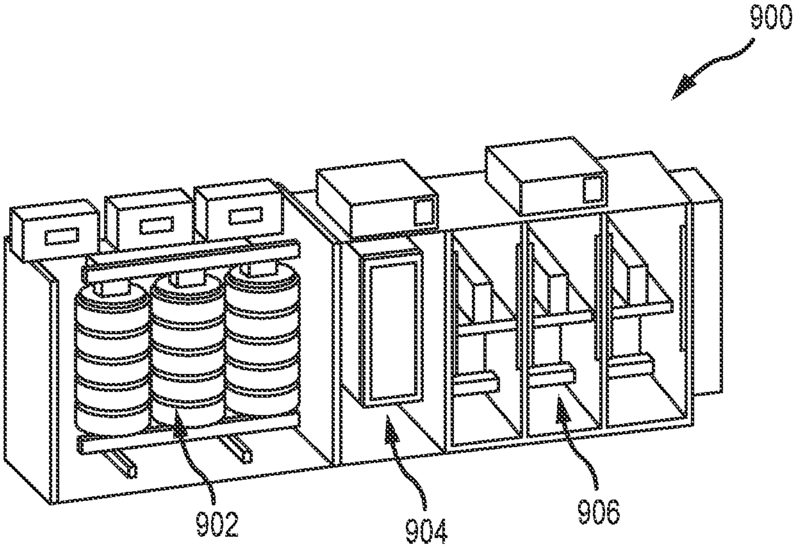
FIG. 9 is a partial schematic perspective view of an embodiment of an enclosure, in accordance with embodiments of the present disclosure.

FIG. 9 is a schematic partial perspective view of the enclosure for the VFD assembly 900 illustrating the transformer section 902, rectifier/control section 904, and inverter/output section 906. In various embodiments, the VFD assembly 900 may include one or more features or controls to enable low harmonics, meeting or exceeding IEEE 519-2014 specifications. Moreover, the VFD assembly 900 may further enable a higher true power factor (e.g., greater than 0.95) than configurations that run motors across the line. In various embodiments, an advanced user interface design enables operators to interact with the VFD assembly 900 to control or monitor operations.

In various embodiments, the VFD assembly 900 may operate in temperatures from −45 degrees C. to 50 degrees C., thereby providing flexibility in operations. Moreover, the VFD assembly 900 may be configured to enable operation with standard motors without the need for special motor insulation or cables. In order to provide predictability in operations, the VFD assembly 900 may be designed with a ten-year mean time between failures, thereby enabling operators to plan for maintenance activities.

Furthermore, in various embodiments the VFD assembly 900 incorporates an enclosure cooling system (not pictured) with a combination of air-to-air heat exchangers along with forced air cooling of the power modules. Utilizing a totally enclosed cooling system where no (or nearly no) exchange of internal air and external air occurs enables the internal drive components to remain clean and uncontaminated from the environment, which may include pollutants or dust.

Accordingly, the costs and challenges associated with filter maintenance to keep the pollutants or dust out of the enclosure are eliminated.

Embodiments of the VFD assembly 900 further include a copper-wound input isolation transformer that provides 36 pulse phase-shift harmonic cancellation that meets or exceeds IEEE 519-2014. This isolation transformer may function similarly to a linear load on the incoming AC line. The soft charge reactor on the primary side of the isolation transformer maximizes the longevity of the transformer and minimizes the in rush current on weak grid systems.

Additionally, embodiments of the VFD assembly 900 further include a five-level NPC PWM output that closely simulates a true sine wave, which minimizes motor failures caused by insulation stress and long lead-length issues. The output waveform topology may be suitable for use on existing non-inverter duty motors without upgrading the motor insulation system.

In various embodiments, the VFD assembly 900 utilizes advanced IGBT technology with robust multi-level topology and controls with a fast industrial processor. Furthermore, an LCD Electronic Operator Interface enables quick, user-friendly programming. In various embodiments, faults are logged containing date and time steps. Furthermore, programming inputs and outputs are included to meet specific application needs. Moreover, the VFD assembly 900 may further include software to capture, extract, and compress full operating data at the time of a fault. This track-back data allows users to capture data with ease for detailed fault analysis, which can be submitted for remote diagnostics and support. In various embodiments, the VFD assembly 900 and associated software will include functional capabilities to communicate with one or more of DeviceNet, EtherNet/IP, Modbus RTU, Modbus TCP, Profibus, Tosline-S20, TCNet, and Ethernet Global Data (EGD).

In various embodiments, the VFD assembly 900 may further include features to streamline operations or provide improved diagnostic information. These features may include, communication cards, door-mounted equipment such as meters, pilot lights, speed potentiometer, and switches, direct online bypass, motor protection relay, RTD monitor, dV/dt or sine wave output filters, a solid state starter bypass, and multiple motors synchronous transfer and capture. Furthermore, features such as synchronous motor control (AC Brushless/DC Brush Type) and drive and motor space heater may also be incorporated. Additionally, an optional walk-in enclosure for power electronic components may be utilized. In embodiments, the VFD assembly may also include a voltage source inverter (VSI) with V/f Control and PID control and induction motor sensorless vector control synchronous motor sensorless Vector Control, and Closed Loop Vector Control (Using Pulse Generator Encoder or Resolver).

As described above, in various embodiments the VFD is utilized to control the one or more motors that operate the electric frac pumps. Specifications for the VFDs may include 3,500 HP-6,000 HP drive (one embodiment would be two 3,500 HP drives powering two 3,000-3,500 HP pumps) (another embodiment would be one 6,000 HP drive powering one 6,000 HP pump), output frequency of 0-120 HZ, and a control method including a five-level pulse-width modulation (PWM) output control with neutral-point clamping (NPC). Additionally, the VFD may include V/Hz Control such as V/Hz, sensorless vector control, variable torque, closed-loop vector control, and constant torque. In embodiments the VFD has a rotary encoder integrated into EOI. The VFD may also be used to protect the motor and/or the pumps via current limits, overcurrent, overload, undervoltage, overvoltage, ground fault, CPU error, and soft stall. In certain embodiments, the VFD may include speed regulation in the open loop up to 0.5% and the closed loop up to 0.1%. Further the VFD may include an overload current rating of 100% continuous or 115% for one minute every 20 minutes.

As described above, the VFD assembly may be operable via a control interface that enables operators to monitor and control the VFDs. The VFD control interface may include digital input, such as ten discrete inputs with programmable functions. It may also include digital output, such as ten available digital programmable outputs. In various embodiments, the VFD control interface includes analog input, such as three selectable currents (0/4 to 20 mA) or voltage (0-10 VDC) input signals. It may also include analog outputs, such as three to eight selectable output current (0/4 to 20 mA) or voltage (0-10 VDC). In certain embodiments, the control interface further includes communication ports, for example, Profibus, Modbus RTU & TCP, TOSLINE-S20, TCNet, Ethernet Global Data (EGD), DeviceNet & EtherNet/IP. Furthermore, the control interface may include safety features such as a standard pad-lockable input fuse disconnect switch with vacuum contactor, interlocked doors, and viewing window.

Furthermore, in various embodiments, each VFD will also be able to be controlled remotely via a wired or wireless control from the hydraulic fracturing data van control module or a remote suitcase. Moreover, a local display may be included. In embodiments, the local display is a 4-digit, 7-segment LED display and 4×20 character graphical plain English back-lit LCD display for programming, monitoring, and diagnostics. Furthermore, local LED indicators may be included, such as run (red)/stop (green) and local (green). Additionally, embodiments may incorporate local keys, such as local/remote, enter, mon/Prg, Esc, Run, and Stop/Reset, and monitoring. The monitoring may relay information to a frequency command screen, and display parameters such as motor current, motor speed, motor voltage, dc voltage, input voltage, output voltage, run time, output power, motor kW, motor kWH, motor kVAH, motor kVAR, and on-time Control power. In various embodiments, the above-described outdoor enclosure is NEMA 3R, free standing, and provides front-access only. Additionally, the outdoor enclosure may have bottom-entry power cables for input as well as the above-described forced-air cooling. In various embodiments, components of the present disclosure comply with standards and compliances such as NEC, NEMA, UL, ULC, ANSI, & American Recovery & Reinvestment Act Compliant.

Figure 10:
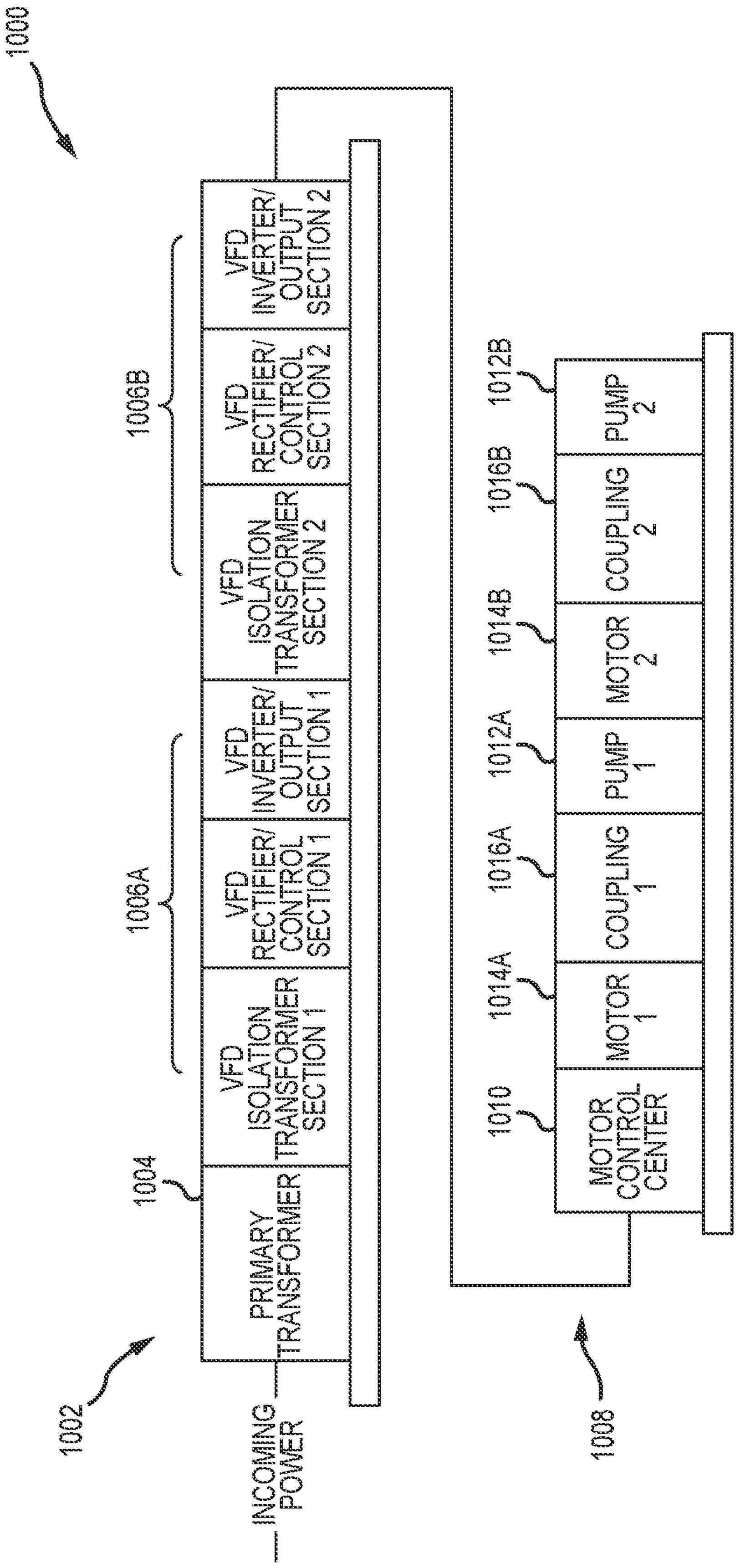
FIG. 10 is a schematic block diagram of an embodiment of a pumping configuration, in accordance with embodiments of the present disclosure.

FIG. 10 is a schematic diagram of an embodiment of a power distribution configuration 1000. In the illustrated embodiment, a first trailer or skid 1002, which may be referred to as a support skid, includes a primary transformer 1004 and two VFDs 1006A, 1006B. As shown, the VFDs each include a VFD isolation transformer, a VFD rectifier/control, and a VFD inverter/output. This support skid supplies electrical energy to a second trailer or skid 1008, which may be referred to as a frac pump trailer, that includes an MCC 1010 and a pair of pumps 1012A, 1012B with associated motors 1014A, 1014B and couplings 1016A, 1016B. The pair of pumps 1012A, 1012B may each be rated at or about 3,000 HP. In the illustrated embodiment, each VFD 1006A, 1006B of the support skid 1002 is utilized to control and monitor operations of a respective motor 1014A, 1014B powering one of the pumps 1012A, 1012B on the frac pump trailer 1008. Accordingly, as described above, there is additional space available on the frac pump trailer 1008, due to the removal of elements such as the transformer or VFDs, and therefore more or larger pumps may be arranged on the frac pump trailer 1008.

Figure 11:
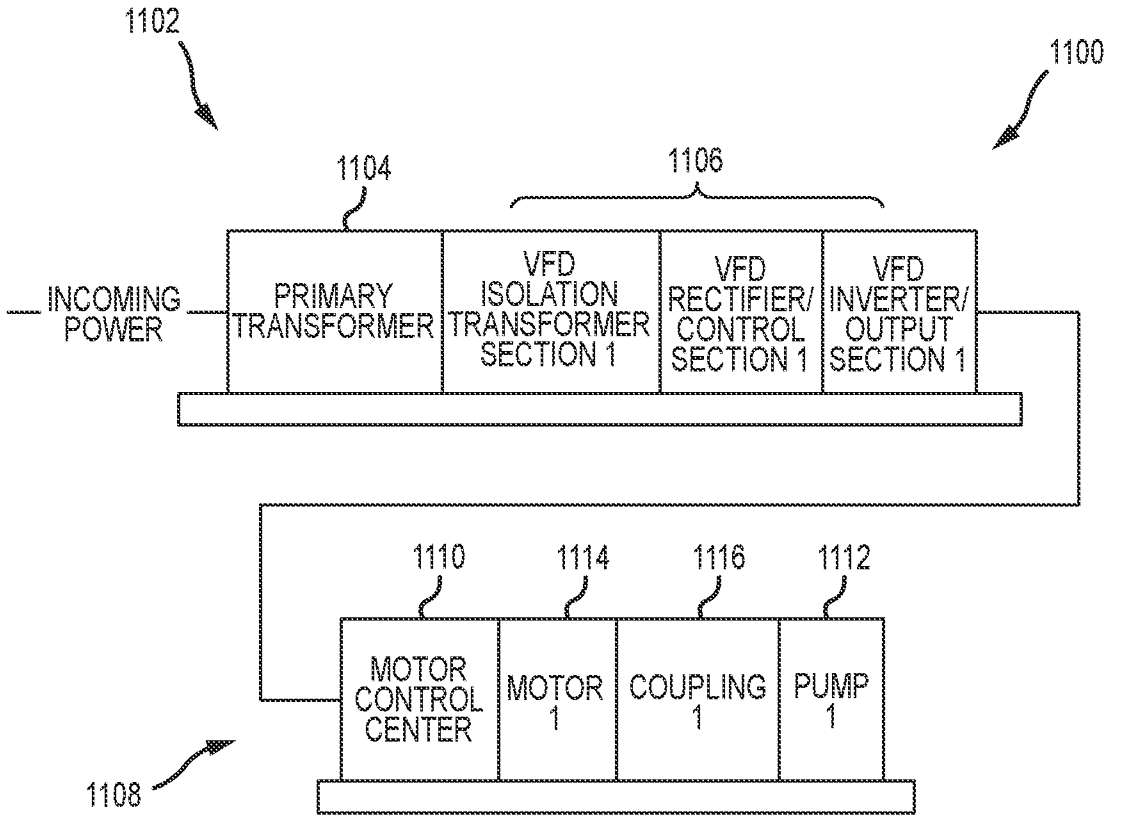
FIG. 11 is a schematic block diagram of an embodiment of a pumping configuration, in accordance with embodiments of the present disclosure.

FIG. 11 is a schematic diagram of an embodiment of a power distribution and pumping configuration 1100. The illustrated embodiment includes the first trailer 1102, which may be a support skid, having the primary transfer 1104 and a VFD 1106. The illustrated VFD 1106 includes the isolation transformer section, the rectifier/control section, and the inverter/output section. The support skid 1102 supplies power and controls the motor of the second trailer 1108, which may be a frac pump trailer. The illustrated frac pump trailer 1108 includes the MCC 1110 and a single pump 1112, which further includes a motor 1114 and coupling 1116. The illustrated pump 1112 may be rated for 6,000 HP. As described above, removing one or more components from the frac pump trailer enables larger pumps. Compared to the embodiment illustrated in FIG. 10 with the dual pumping configuration, the embodiment illustrated in FIG. 11 may have a larger pump having a larger horsepower capability.

It should be appreciated that while various embodiments described herein discuss voltages such as 4,160 V or 13.8 kV that other voltages may be utilized. For example, other options may include 600 V, 480 V, 240 V, or any other voltage that may be utilized commercially. Frequency can be approximately 50 Hz or 60 Hz. Moreover, in embodiments, the turbine generators may each produce approximately 5.7 MW of electricity. However, other turbine generators producing less electricity or more electricity may be utilized. Additionally, it should be appreciated that the power can be broken up into one or more banks. Moreover, in embodiments, the generators and/or the equipment may be particularly selected based on the power output or generate of the other. For example, in embodiments the generators may produce power at 4,160 V and the associated equipment may also operate at 4,160 V. In other embodiments, the generators may produce power at 600 V and the associated equipment may also operate at 600 V. In other embodiments, the generators may produce power at 13.8 kV and the associated equipment may also operate at 13.8 kV. Additionally, as described above, various transformers may be utilized to step down voltages to enable equipment operating at different voltages to be incorporated into various pumping configurations.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A hydraulic fracturing system, comprising:

an electric pump, arranged on a support structure, the electric pump coupled to a well associated with a subterranean formation and powered by at least one electric motor, the electric pump configured to pump fluid into a wellbore associated with the well, wherein the electric pump has a rated horsepower of approximately 3,000 horsepower (HP);

a variable frequency drive (VFD), arranged on the support structure, electrically coupled to the electric pump;

a control system, arranged on the support structure, and configured to control one or more operational parameters of the electric pump, and comprising:

a VFD transformer;

a VFD rectifier; and a VFD inverter; and a transformer, arranged on the support structure, and configured to distribute electrical power to the electric pump, the VFD, or the control system, the transformer positioned to receive, from at least one generator, power at a voltage higher than a respective operating voltage of the electric pump, the VFD, or the control system.

2. The hydraulic fracturing system of claim 1, wherein the support structure is a trailer, a skid, a pad, a truck bed, or a combination thereof.

3. The hydraulic fracturing system of claim 1, wherein the VFD controls the speed of the at least one electric motor.

4. The hydraulic fracturing system of claim 1, wherein the VFD and the control system are positioned within a common housing.

5. The hydraulic fracturing system of claim 1, wherein the power from the at least one generator is at 13.8 kV and the transformer steps the power down to 600 V.

6. The hydraulic fracturing system of claim 1, wherein the rated horsepower of the electric pump exceeds a rated brake horsepower of the at least one electric motor.

7. The hydraulic fracturing system of claim 1, wherein the VFD further comprises:

a human-machine interface configured to receive operational controls.

8. The hydraulic fracturing system of claim 1, wherein the VFD is positioned within an enclosure with a cooling system, the cooling system comprising:

an air-to-air heat exchanger; and forced air cooling;

wherein the cooling system is an enclosed cooling system configured to limit exchange of air internal to the enclosure and air external to the enclosure.

9. The hydraulic fracturing system of claim 2, further comprising:

at least one switchgear system configured to receive power from the at least one generator.

10. The hydraulic fracturing system of claim 1, wherein the rated horsepower of the is between 3,000 and 3,500 HP.

11. A hydraulic fracturing system, comprising:

an electric pump, arranged on a support structure, the electric pump coupled to a well associated with a subterranean formation and powered by at least one electric motor, the electric pump configured to pump fluid into a wellbore associated with the well, wherein the electric pump has a rated horsepower of approximately 3,000 horsepower (HP);

a variable frequency drive (VFD), arranged on the support structure, electrically coupled to the electric pump, and positioned within an enclosure with a cooling system, the cooling system comprising:

an air-to-air heat exchanger; and forced air cooling, wherein the cooling system is an enclosed cooling system configured to limit exchange of air internal to the enclosure and air external to the enclosure;

a control system, arranged on the support structure, and configured to control one or more operational parameters of the electric pump, and comprising:

a VFD transformer;

a VFD rectifier; and a VFD inverter; and a transformer, arranged on the support structure, and configured to distribute electrical power to the electric pump, the VFD, or the control system, the transformer positioned to receive, from at least one generator, power at a voltage higher than a respective operating voltage of the electric pump, the VFD, or the control system.

12. The hydraulic fracturing system of claim 11, wherein the support structure is a trailer, a skid, a pad, a truck bed, or a combination thereof.

13. The hydraulic fracturing system of claim 11, wherein the VFD controls the speed of the at least one electric motor.

14. The hydraulic fracturing system of claim 11, wherein the VFD and the control system are positioned within a common housing.

15. The hydraulic fracturing system of claim 11, wherein the power from the at least one generator is at 13.8 kV and the transformer steps the power down to 600 V.

16. The hydraulic fracturing system of claim 11, wherein the rated horsepower of the electric pump exceeds a rated brake horsepower of the at least one electric motor.

17. The hydraulic fracturing system of claim 11, wherein the VFD further comprises:

a human-machine interface configured to receive operational controls.

18. The hydraulic fracturing system of claim 11, further comprising:

at least one switchgear system configured to receive power from the at least one generator.

19. The hydraulic fracturing system of claim 11, wherein the rated horsepower of the is between 3,000 and 3,500 HP.

* * * * *